United States Patent [19]
Enokido et al.

[11] Patent Number: 5,439,427
[45] Date of Patent: Aug. 8, 1995

[54] MULTIPLE STAGE AUTOMATIC TRANSMISSION

[75] Inventors: Kazunori Enokido; Hidehiko Mishima; Toshihisa Marusue; Tatsutoshi Mizobe; Shigeru Nagayama; Takayuki Sumimoto, all of Hiroshima; Minoru Kuriyama, Higashi-Hiroshima; Shinya Kamada, Hiroshima, all of Japan

[73] Assignee: Mazda Motor Corporation, Hiroshima, Japan

[21] Appl. No.: 43,702

[22] Filed: Apr. 8, 1993

[30] Foreign Application Priority Data

Apr. 10, 1992 [JP] Japan .................................. 4-091254
Apr. 20, 1992 [JP] Japan .................................. 4-128174
May 29, 1992 [JP] Japan .................................. 4-163815
Jun. 12, 1992 [JP] Japan .................................. 4-179279

[51] Int. Cl.⁶ ............................................ F16H 61/08
[52] U.S. Cl. ................................ 477/130; 477/143
[58] Field of Search ..................... 477/130, 131, 143; 192/87.16, 106 F

[56] References Cited

U.S. PATENT DOCUMENTS

| | | |
|---|---|---|
| 3,605,525 | 9/1971 | Pierce et al. ................. 477/130 |
| 3,650,364 | 3/1972 | Laing . |
| 3,693,480 | 9/1972 | Lemieux . |
| 3,803,948 | 4/1974 | Clauss, Jr. et al. . |
| 4,007,648 | 2/1977 | Bookout . |
| 4,253,553 | 3/1981 | Yamada et al. ............... 477/130 |
| 4,732,253 | 3/1988 | Hiramatsu et al. . |
| 4,949,597 | 8/1990 | Ueki et al. ................... 477/130 |
| 5,012,699 | 5/1991 | Aoki et al. ................... 477/143 |
| 5,109,731 | 5/1992 | Iwatsuki et al. . |
| 5,194,057 | 3/1993 | Sommer .................... 192/87.16 |
| 5,195,036 | 3/1993 | Kimura et al. ............... 477/130 |
| 5,259,489 | 11/1993 | Kimura et al. ............... 192/106 F |

FOREIGN PATENT DOCUMENTS 51-127968 11/1976 Japan .
61-99745 5/1986 Japan .

*Primary Examiner*—John T. Kwon
*Attorney, Agent, or Firm*—Keck, Mahin & Cate

[57] ABSTRACT

A multiple stage automatic transmission includes a main transmission mechanism, a sub-transmission mechanism connected with the main transmission mechanism to for introduction of a torque therefrom, and a frictional element connected with the sub-transmission. The engaging force of the frictional element is changed at least by two steps in accordance with a shift mode without changing a hydraulic pressure applied for actuating the frictional element. A shift shock, therefore, can be obviated.

10 Claims, 16 Drawing Sheets

MULTIPLE STAGE AUTOMATIC TRANSMISSION

CROSS-REFERENCE TO RELATED APPLICATIONS

The pending applications related to the present application are U.S. patent application Ser. No. 812,814, entitled "CONTROL SYSTEM FOR AUTOMATIC TRANSMISSION", U.S. Ser. No. 949,211, entitled "SHIFT CONTROL SYSTEM FOR AUTOMATIC TRANSMISSION", which are assigned to the same assignee as the present application.

BACKGROUND OF THE INVENTION

Field of the Invention

The present invention relates to a multiple stage automatic transmission in which a main transmission is connected with a sub-transmission in tandem to increase the number of shift stages of a system as a whole.

Description of the Prior Art

Generally, an automatic transmission for an automotive vehicle is provided with a torque converter and a shift gear mechanism wherein the torque converter amplifies an engine output torque and transmits it to a turbine shaft and wherein the shift gear mechanism shifts the torque transmitted to the turbine shaft and transmits it for drive wheels. The shift gear mechanism is, generally, provided with a planetary gear mechanism having a sun gear, ring gear, pinion gear and carrier in combination with a plurality of frictional elements, such as a clutch, brake which are selectively actuated to be engaged and disengaged. Thus, a hydraulic control mechanism is employed to switch on-off patterns of the frictional elements to thereby establish a desired shift stage automatically.

In the automatic transmission, as the number of the shift stages is increased, torque transmission characteristics can be broadly selected in accordance with a road condition or running condition of the vehicle so that a running performance and fuel consumption efficiency can be improved. It is limited to provide such broad selectivity of the torque transmission characteristics when a single shift gear mechanism is used. The single shift gear mechanism can provide at most four different shift stages for forward movement.

In view of this, it has been proposed that a transmission system provided with two shift gear mechanisms (main transmission and sub-transmission) which are combined in tandem to increase the number of shift gear stages. For example, Japanese Patent Public Disclosure No. 51-127968, laid open to the public in 1976, discloses such type of transmission system.

U.S. Pat. No. 5,109,731 discloses an automatic transmission in which a shift operation is made in the sub-transmission in response to a shift operation of the main transmission.

If the main transmission is provided with three shift stages and sub-transmission is provided with two shift stages for forward movement, the combined transmission can provide six shift stages. If five shift stages are actually required, one shift stage as provided by a change of combination of the main and sub-transmissions may be omitted out of six combinations.

When so called schedule up-shift in which an up-shift is made under a constant throttle opening is required, it is necessary for the sub-transmission to make a shift change by two steps. In detail, while shift changes are made in the main transmission among low (Lo), middle (Mid) and high (Hi) speed stages, shift changes are made in the sub-transmission between low and high speed stages for two stages among the three stages of the main transmission. The amount of the torque transmitted to the sub-transmission is provided by multiplying an input torque for the whole transmission or the main transmission by a gear ratio of the main transmission.

Thus, as a torque difference in the main transmission from one to the other is increased, a control band for a frictional element such as clutch and brake in the sub-transmission involved in the shift operation is increased. This means that the control band is widely changed depending on the shift operation. The frictional element is, usually, controlled by a hydraulic pressure. The maximum capacity of the frictional element needed can be determined by a physical load condition which is applied to the frictional element. If the control band is widely changed within the range of the capacity of the frictional element, the hydraulic pressure for controlling the frictional element is needed to be properly controlled to make a shift operation.

Conventionally, the frictional element is controlled by means of a single piston in a manner that a predetermined hydraulic pressure is introduced into an apply chamber to move the piston to engage the frictional element. In this control, as the control band required is increased, in other words, if the difference in engaging force which corresponds to the torque difference between the two frictional elements for transmitting the torque therethrough is increased, the change of the hydraulic pressure for applying the frictional element is increased. This makes the control of the hydraulic pressure difficult.

Specifically, if the sub-transmission is switch between the high and low speed stages in the case where the main-transmission is switched between the low and high speed stages (not consecutive stages), the torque difference in the main transmission involved in the shift operation is tremendous to cause a tremendous torque difference in the sub-transmission as well. This makes the hydraulic control for the frictional element of the sub-transmission more difficult.

SUMMARY OF THE INVENTION

It is therefore an object of the present invention to provide a multiple stage automatic transmission having a main and sub-transmission in which a hydraulic control for the sub-transmission can be simply and properly made. It is another object of the present invention to reduces the torque change applied to the sub-transmission.

The above and other object of the present invention can be accomplished by a multiple stage automatic transmission comprising a main transmission mechanism, a sub-transmission mechanism connected with the main transmission mechanism to introduce a torque therefrom, a frictional element connected with the sub-transmission, and the engaging force of the frictional element being changed at least by two steps in accordance with a shift mode without changing g a hydraulic pressure applied for actuating the frictional element.

According to the present invention, even when the torque transmitted to the sub-transmission is increased beyond a predetermined value in the case where the main transmission is shifted in accordance with the change of the shift mode to change the gear ratio thereof, there is no need to change the hydraulic pressure applied to the frictional element of the sub-transmission in order to change the engaging force of the frictional element in making a desired shift operation.

In the preferred feature of the invention, the change means changes the engaging force of the frictional element in response to the shift operation of a shift stage in the main transmission. Further, the change means preferably provide the engaging force with a relatively great value when the shift stage of the main transmission is a low speed shift stage and with a relatively small value when the shift stage of the main transmission is a high speed shift stage.

The frictional element comprises a first piston of a larger pressure area to which a engaging hydraulic pressure is applied for producing a larger engaging force the frictional element and a second piston of a smaller pressure area for producing a smaller engaging force.

When both the first and second pistons are actuated, the largest engaging force is produced. Preferably, the first piston is disposed coaxially with and in front of the second piston. In another structure, the first piston is disposed coaxially with and behind the second piston.

Further, a balance chamber is provided for relieving an excessive pressure produced by a centrifugal force in front of the first piston.

According to the present invention, there are provided a first hydraulic chamber defined behind the first piston and in front of the second piston for receiving the engaging hydraulic pressure to urge the first piston and a second hydraulic chamber defined behind the second piston for urging the second piston.

In a preferred embodiment, the transmission comprises an intermediate member disposed in the first hydraulic chamber to partition the first hydraulic chamber to form an intermediate hydraulic chamber behind the first chamber so that the engaging pressure for the frictional element is variable by three steps by introducing the hydraulic pressure into the first, second and intermediate chambers selectively. In another aspect, there is provided a select shift valve for selectively introducing the hydraulic pressure to the first and second hydraulic chamber.

Further, there can be provided a supply select valve provided between the chambers and the select shift valve in a hydraulic passage, and an accumulator for damping a change in the hydraulic pressure provided on the hydraulic passage.

In the control, the hydraulic pressure is released from one of the chambers when the hydraulic pressure is fully introduced into the other of the chambers in a shift operation. In another aspect, the hydraulic pressure is introduced into both chambers in one shift operation in which a larger engaging force is needed for the frictional element, whereas the hydraulic pressure is introduced into one of the chambers in another shift operation in which a smaller engaging force is needed for the frictional element. In this case, the hydraulic pressure is held in a hydraulic chamber in which the hydraulic pressure is supposed to be introduced for both shift stages which a shift operation is made therebetween.

In another aspect, there is provided a solenoid valve for controlling the hydraulic pressure introduced into one of the chambers. The solenoid valve produces the hydraulic pressure without adjusting a basic pressure from an hydraulic source when electric power supply is interrupted. The transmission further comprises control means for interrupting the electric power supply when a predetermined shift stage is established by introducing the hydraulic pressure into the other chamber. In a preferred embodiment, the control means releases the hydraulic pressure from one of the chambers first and thereafter releases the hydraulic pressure from the other of the chambers in a shift operation where the frictional element is released.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
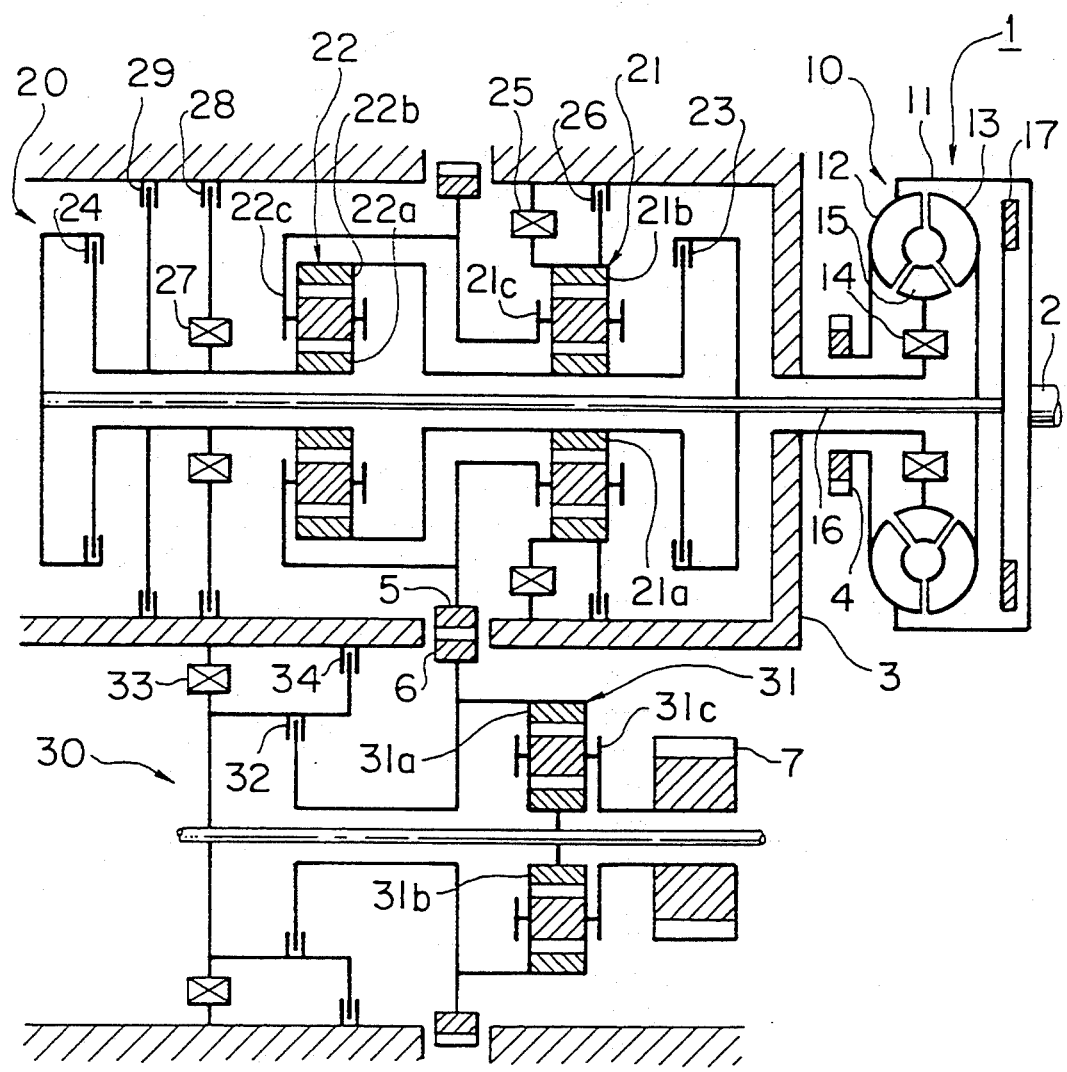
FIG. 1 is a schematic view of a multiple stage automatic transmission to which a control system in accordance with the present invention can be applied.

Referring to FIG. 1, an automatic transmission 1 according to the present invention includes a torque converter 10, a main transmission 20 coaxial disposed with the torque converter 10 and a sub-transmission 30 disposed on an axis in parallel with the axis of the torque converter 10 and the main transmission.

The torque converter 10 is provided with a pump 12 integral with a transmission case 11 connected with an output shaft 2 of an engine, a turbine 13 disposed facing the pump 12 and driven thereby through a hydraulic fluid, a stator 15 disposed between the pump 12 and turbine 13 and carried by the converter case 11 through a one way clutch 14, a converter output shaft 16 connected with the turbine 13, and a lock-up clutch 17 for directly connecting the output shaft 16 with the engine output shaft 2 through the converter case 11. An oil pump 4 driven by the engine output shaft 2 through the torque converter 10 is arranged between the torque converter 10 and the main transmission 20.

The main transmission 20 is provided with a front planetary gear mechanism 21 disposed close to the torque converter on the converter output shaft 16 and a rear planetary gear mechanism 22 arranged opposite to the torque converter 10. The output shaft 16 is connected with a sun gear 21a of the front planetary gear mechanism 21 through a forward clutch 23 and with a sun gear 22a of the rear planetary mechanism 22 through the direct clutch 24. The sun gear 21a is connected with a ring gear 22b of the rear planetary gear mechanism. Between a ring gear 21b of the front planetary gear mechanism 21 and the transmission case 3 are disposed a first one way clutch 25 and low reverse brake 26 in parallel. Between the sun gear 22a of the rear planetary gear mechanism 22 and the transmission gear 3 are disposed a second one way clutch 27 and a 3-4 brake 28 in tandem and coast brake 29 for engine brake in parallel with the clutch 27 and brake 28. Pinion carriers 21c and 22c of the front and rear planetary gear mechanisms are connected with each other and an intermediate gear 5 for transmitting the torque from the main transmission 20 to sub-transmission 30 is connected thereto.

Thus, the main transmission 20 establishes a low, middle and high speed stages for forward movement and one stage for reverse movement.

In detail, the torque from the output shaft 16 of the torque converter is introduced into the sun gear 21a of the front planetary gear mechanism 21. In this case, the ring gear 21b is fixed to the case 3 through the first one way clutch 25 so that the rotation of the output shaft 16 is transmitted to the intermediate gear 5 through the pinion carrier 21c of the front planetary gear mechanism 21 with a great speed reduction ratio to provide a low speed stage.

In this stage, when the 3-4 brake is engaged, the gun gear 22a of the rear planetary gear mechanism 22 is fixed through the second one way clutch 27. As a result, the power introduced into the ring gear 22b through the forward clutch 23 and the sun gear 21a from the converter output shaft 16 is transmitted to the intermediate gear 5 through the pinion carrier 22c with a speed reduction ratio smaller than that of the low speed stage to provide a middle speed stage.

In the middle speed stage, when the direct clutch 24 is engaged, the power from the output shaft 16 is introduced to the ring gear 22b of the rear planetary gear mechanism 22 through the forward clutch 23 and the sun gear 21a. The power is introduced into the sun gear 22a of the rear planetary mechanism 22 through the direct clutch 24. Thus, the rear planetary mechanism 22 rotates integrally as a whole as if it is a single element so that the power is transmitted to the intermediate gear 5 from the pinion carrier 22c with a same rotation as the output shaft 16 to provide a high speed stage (or direct connection).

Then, if the forward clutch 23 is released and the direct clutch 24 is connected with the low reverse brake 26, the power of the converter output shaft 16 is introduced into the sun gear 22a of the rear planetary gear mechanism 22. Concurrently, the ring gear 21b is fixed so that the power is reversely transmitted from the pinion carriers 21c and 22c to the intermediate gear 5 to provide the reverse stage.

In the low and middle speed stages in which the speed reduction is produced, the first and second one way clutches 25 and 27 are raced to make the engine brake useless. In this case, it should be, however, noted that the low reverse brake 26 in parallel with the first one way clutch is engaged in the low speed stage and coast brake 29 in parallel with the second one way clutch 27 is engaged in the middle speed stage so that the engine brake can work effectively in the low and middle speed stages.

The sub-transmission 30 is provided with a single planetary gear mechanism 31. An intermediate gear 6 which is always meshed with the intermediate gear 5 of the main transmission 20 is connected with a ring gear 31a of the planetary gear mechanism 31. Between the ring gear 31a and a sun gear 31b is disposed a direct clutch 32 and between the sun gear 31b and the case 3 are disposed a third one way clutch 33 and reduction brake 34 in parallel with each other. Then, an output gear 7 is connected with a pinion carrier 31c of the planetary gear mechanism 31. The power is transmitted from the output gear 7 to right and left drive wheels (not shown) through a differential gear mechanism.

The sub-transmission 30 shifts the power introduced thereto from the intermediate gears 5 and 6 from the main transmission 20 by two steps of low and high speed stages for forward movement and introduces the power to the output gear 7.

In detail, when the direct clutch 32 is released, third one way clutch 33 is fixed or the sun gear 31b is fixed by a reduction speed brake 34. As a result, the power from the intermediate gear 6 is reduced in rotation speed and introduced through the pinion gear 31c to the output gear 7 to provide the low speed stage. In this case, when the reduction speed brake 34 is engaged, the engine brake works in the sub-transmission 30 by itself.

On the other hand, if the direct clutch 32 is engaged and if the brake 34 is released, the ring gear 31a is connected with the sun gear 31b. As a result, the power from the gear 6 is introduced into the output gear as it is so that the high speed stage (direct connection) is established.

Thus, the main transmission 20 provides three stages for forward movement and one stage for reverse movement. The sub-transmission 30 provides two stages of high and low speed for each output of the main transmission 20. Therefore, the automatic transmission as whole can get six different speed shift stages for forward movement and one reverse stage which is established through the reverse stage of the main transmission 20 and the low speed stage of the sub-transmission 30 in which the reduction brake 34 is engaged. In the illustrated embodiment, five shift stages are actually established among the possible combinations.

Table 1 shows operations of the respective frictional elements such as clutch and brake in the five shift stages for forward movement and one reverse stage. In Table 1, (0) shows that an element involved is engaged when the engine brake works.

TABLE 1

| | SHIFT STAGE | MAIN TRANSMISSION | | | | |
|---|---|---|---|---|---|---|
| | | DIRECT CLUTCH | FORWARD CLUTCH | 3-4 BRAKE | COAST BRAKE | LOW REVERSE BRAKE |
| 1 RANGE | LOW SPEED STAGE | | O | | | (O) |
| 2 RANGE | LOW SPEED STAGE | | O | | | (O) |
| 3 RANGE | MIDDLE SPEED STAGE | | O | O | O | |
| 4 RANGE | MIDDLE SPEED STAGE | | O | O | O | |
| 5 RANGE | HIGH SPEED STAGE | O | O | O | | |
| REVERSE RANGE | REVERSE STAGE | O | | | | O |

| | MAIN TRANSMISSION | | SUB TRANSMISSION | | | |
|---|---|---|---|---|---|---|
| | FIRST ONEWAY CLUTCH | SECOND ONEWAY CLUTCH | SHIFT STAGE | DIRECT CLUTCH | REDUCTION BRAKE | THIRD ONEWAY CLUTCH |
| 1 RANGE | Lock | Free | LOW SPEED STAGE | | O | Lock |
| 2 RANGE | Lock | Free | HIGH SPEED STAGE | O | | Free |
| 3 RANGE | Free | Lock | LOW SPEED STAGE | | O | Lock |
| 4 RANGE | Free | Lock | HIGH SPEED STAGE | O | | Free |
| 5 RANGE | Free | Free | HIGH SPEED STAGE | O | | Free |
| REVERSE RANGE | Free | Free | LOW SPEED STAGE | | O | Free |

Figure 2:
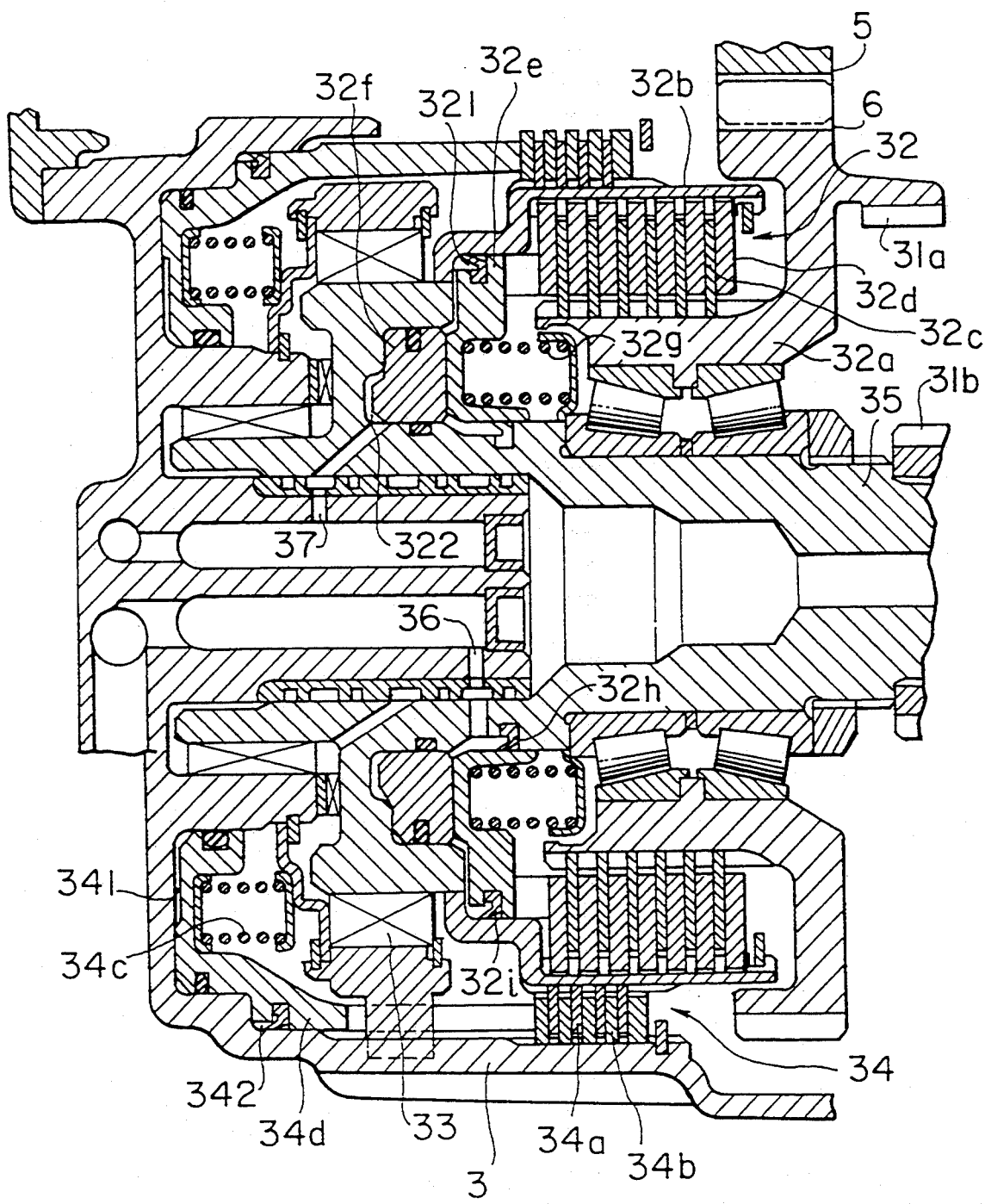
FIG. 2 is a sectional view of a sub-transmission in accordance with the present invention.

In the illustrated embodiment, there is provided a double piston structure for actuating the direct clutch 32 and speed reduction brake 34 as shown in FIG. 2.

In detail, the direct clutch 32 is provided with a hub member 32a formed integrally with ring gear 31a and the intermediate gear 6, a plurality of frictional drive and driven plates of 32c and 32d disposed alternatively in the drum member 32b formed integrally with a shaft 35 to which the sun gear 31b is fixed, a first piston 32e of a larger diameter having a larger pressure area disposed behind the plates 32c and 32d, a second piston 32f of a smaller diameter having a smaller pressure area disposed behind the first piston 32e and a return spring 32g for the two pistons 32e and 32f.

There are provided a first hydraulic chamber 321 formed behind the first piston 32e to which an engaging pressure is introduced through a hydraulic passage 36 and a second hydraulic chamber 322 formed behind the second piston 32f to which an engaging pressure is introduced through a hydraulic passage 37. When the same engaging hydraulic pressure is introduced into the chambers 321 and 322, the engaging force for the clutch 32 produced by the first chamber 321 is greater than that produced by the second chamber 322.

The speed reduction brake 34 is provided with a plurality of drive and driven frictional plates 34a and 34b alternatively between the drum member 32b of the direct clutch 32 and the transmission case 3 and a piston 34d for engaging the plates 34a and 34b against the return spring 34c. There are provided coaxially a first hydraulic chamber 341 of a greater hydraulic area formed inner side and a second hydraulic chamber 342 of a smaller hydraulic area formed outer side behind the piston 34d. When the engaging force for the brake 34 produced by the first chamber 341 is greater than that produced by the second chamber 342.

Next, there will be described a hydraulic control circuit for selectively engaging the respective clutches and brakes in accordance with Table 1 so as to establish a desired shift stage according to a driving condition and/or driver's request.

Figure 3:
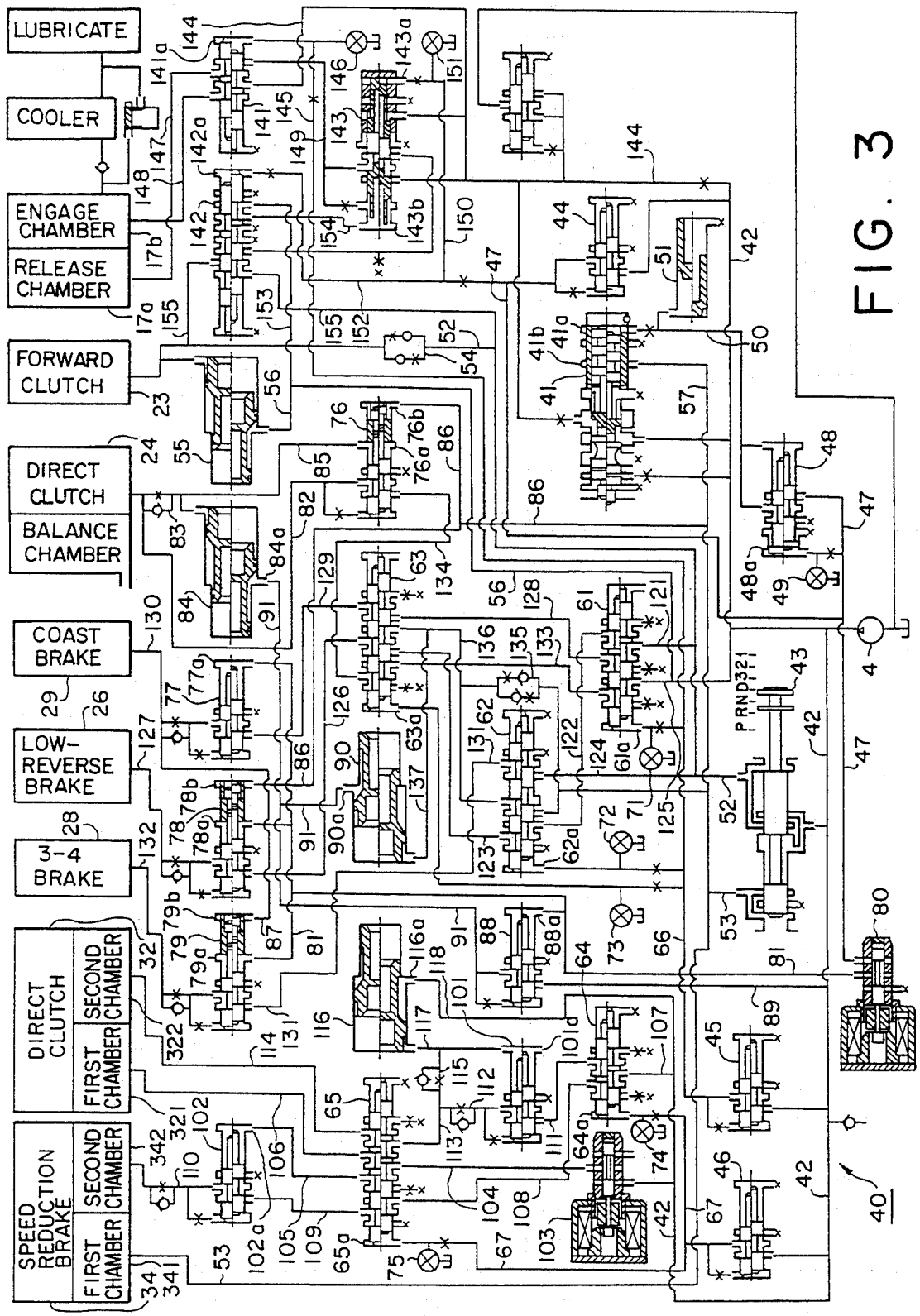
FIG. 3 shows a hydraulic control circuit incorporated into the automatic transmission of FIG. 1.

As shown in FIG. 3, the hydraulic circuit 40 is provided with a regulator 41 for adjusting the hydraulic pressure from the oil pump 4 to a line pressure of a predetermined value. The line pressure adjusted by the regulator 41 is introduced into a manual valve 43 operated by the driver and a first through third reducing valves 44, 45 and 46 for producing basic pressures for respective controls through a main line 42.

A basic pressure reduced to a predetermined value through the first reducing valve 44 is introduced into a modulator valve 48 through a line 47. To a control port 48a of the modulator valve 48 is introduced a control pressure arranged by a duty solenoid valve 49 which produces a modulator pressure modulating the basic control pressure in accordance with a duty ratio (a ratio of ON period to an ON-OFF cycle). The modulator pressure is introduced into a first amplifying port 41a of the regulator 41 through a line 50 to amplify the line pressure in accordance with the duty ratio. In this case, the duty ratio is determined in accordance with a predetermined factor, such as throttle opening of the engine so that the line pressure is adjusted in accordance with the throttle opening and the like. On the line 50 which introduces the modulator pressure to the first amplifying port 41a of the regulator 41 is arranged a first accumulator 51 for suppressing a pulsing of the hydraulic pressure caused by the ON-OFF operation of the duty solenoid valve 49.

The manual valve 43 is allowed to provide D, 3, 2, 1 shift ranges for forward movement, R (reverse) range, N (neutral) range, P (parking) range. When a range is selected for forward movement, the manual valve 43 connects the main line 42 with a forward line 52. When the reverse range is selected, the manual valve 43 connects the main line 42 with a reverse line 53.

The forward line 52 is connected with a forward clutch 23 through an orifice 54. Thus, the forward clutch 23 is usually engaged. On the forward line 52 is disposed an accumulator 55 for damping a pressure shock when the engaging pressure for the forward clutch 23 is applied. To the accumulator 55 is supplied a back pressure through a line 56 from the main line 42.

The reverse line 53 is connected with the first chamber 341 having a larger pressure area of the speed reduction brake 34 of the sub-transmission 30. Thus, in the R range, the reduction brake 34 is engaged by a larger engaging force which is produced by introducing the line pressure to the first chamber 341. A line 57 is separated from the reverse line 53. The line 57 is connected with the pressure amplifying port 41b of the regulator valve 41 so that the line pressure is enhanced in the reverse range R.

On the other hand, the main line 42, forward line 52 and reverse line 53 provide the first, second and third shift valve 61, 62 and 63 of the main transmission 20 and fourth and fifth shift valves of the sub-transmission 30 with the line pressure.

The shift valves 61 through 65 are formed with control ports 61a through 65a at one end. To the ports 61a through 63a is connected a basic control pressure line 66. To the ports 63a through 65a is connected a basic pressure line 66. On the line 66, 67 are disposed first through fifth solenoid valves 71 through 75 of ON-OFF action corresponding to the shift valves 61 through 65. The solenoid valves 71–75 drain through the control ports 61a–65a when the valves 71–75 are ON. Spools of the shift valves 61–65 are at left positions when the corresponding solenoid valves are ON and at right positions when OFF in FIG. 3. Lines from the main line 42, forward line 52 or reverse line 53 to respective clutch and brakes is selectively communicated in accordance with combinations of the solenoid valves 71–75 or the positions of the spools of the shift valves 61–65 so that the clutches and brakes are engaged as shown in Table 1 to obtain the 1-5 shift stages and reverse stage. In this case, the engaging pressure for the clutches and brakes are adjusted to proper values as follows.

There are provided a control valves 76, 77, 78 and 79 for the direct clutch 24, coast brake 29, low reverse brake 26 and 3-4 brake so as to reduce the line pressure and adjust to predetermined engaging pressures. Control pressures for the control valve 77, 78 and 79 for the coast brake, low-reverse brake and 3-4 brake are supplied through a line 81 to control the engaging pressure of the brakes in accordance with the control pressures.

To the control port 76a of the control valve 76 for the direct clutch 24 is provided the engaging pressure as a control pressure produced by a line 82 through a line 85 on which a one-way orifice 83 and a third accumulator 84 are disposed. The starting characteristics of the engaging pressure is controlled by the accumulator 84.

Figure 4:
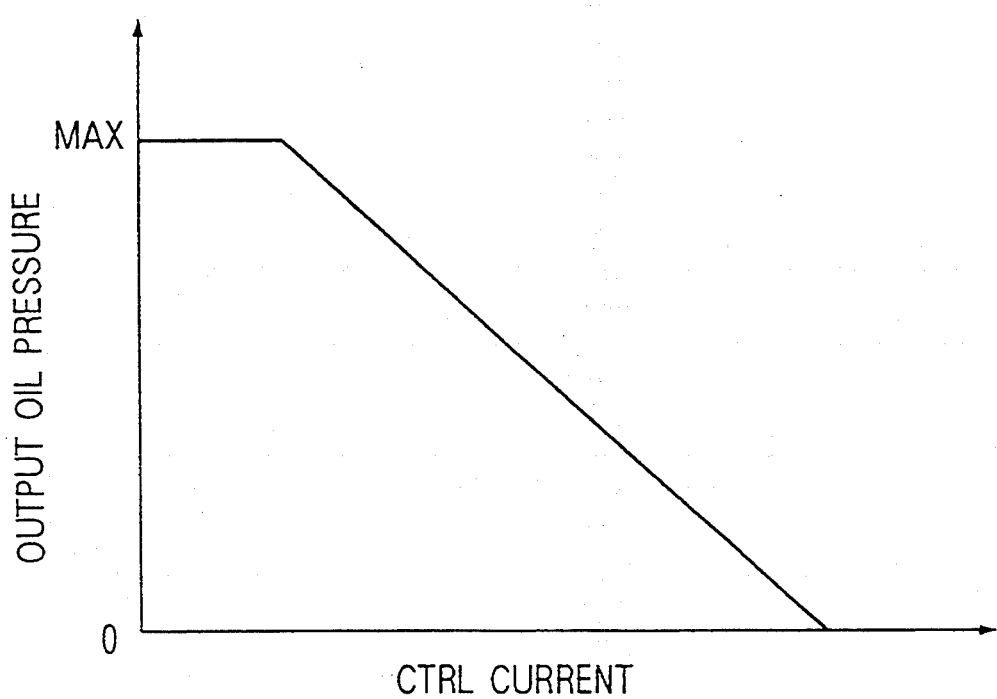
FIG. 4 is a graphical representation showing the output characteristics of the second linear solenoid valve for controlling the engaging pressure of a frictional element of the sub-transmission.

A first linear solenoid valve 80 adjusts the basic control pressure introduced from line 47 through first reducing valve 44 in accordance with signals from a controller to produce a control pressure in accordance with the shift stage and driving condition. The linear solenoid valve, for example valve 80, adjust the hydraulic pressure at a value in proportion to a control current applied thereto as shown in FIG. 4. To ports 76b and 78b formed at one ends of the control valves for the direct clutch and for low-reverse brake 76 and 78 is connected a line 86 separated from the line 53. In R range, the line pressure is introduced to the ports 76b and 78b to place the spools thereof at left position. As a result, the control valves 76 and 78 is kept from pressure control.

Further, to the port 79b formed at one end of the 3-4 brake control valve is introduced the engaging pressure through line 87 when the engaging pressure is introduced into the coast brake 29 so as to operate the control valve 79. The control pressure produced by the first linear solenoid valve 80 is also introduced into the control port 88a of the accumulator control valve 88 through the line 81. The valve 88 adjusts the line pressure from line 89 and main line 42 in accordance with the control pressure of the control valve 80 to make a back pressure for the third accumulator 84 and fourth accumulator 90 and provide back pressure ports 84a and 90a of the accumulators 84 and 90.

For controlling the engaging pressure of the sub-transmission 30, there are provided a direct clutch control valve 101 which controls the engaging pressure introduced into the first and second chambers 321 and 322 and speed reduction brake control valve 102 and second linear solenoid valve 103 for controlling the engaging pressure introduced into the first and second chamber 341 and 342 of the speed reduction brake 34. The line pressure is directly supplied to the first chamber 341 of the speed reduction brake 34.

To the second linear solenoid valve 103 is supplied the line pressure from the main line 42 as a basic control pressure. The valve 103 adjusts the basic control pressure and supplies to a control port 102a of the speed reduction brake control valve 102 through line 104 and from the fifth shift valve 65 through line 105 or 106 and communicates with the first chamber 321 of the direct clutch 32 for controlling the hydraulic pressure therein. The control valve 102 adjust the line pressure which is introduced from the main line 42 through the line 107, fourth shift valve 64, line 108, fifth shift valve 65 and line 109 in accordance with the control pressure when the control pressure produced by the second linear solenoid valve 103 is introduced into the control port 102a, and supplies the adjusted line pressure to the second chamber 342 of the speed reduction brake 34.

On the other hand, to the direct clutch control valve 101 is supplied the line pressure through the main line 42, line 107, fourth shift valve 64, line 111. The valve 101 adjusts the line pressure and supplies the pressure to the first and second chambers 321 and 322 selectively from the shift valve through the one way orifice 112, line 113 and line 106 or line 114.

To the control port 101a of the valve 101 is supplied the engaging pressure for the chambers 321 and 322 of the clutch 32 as the control pressure through line 117 on which one way orifice 115 and fifth accumulator 115 are disposed. Thus, the engaging pressure is increased stepwise at the beginning by virtue of the fifth accumulator 116. To a back pressure port 116a of the accumulator 116 is supplied a back pressure through the main line 42 and line 118.

In the hydraulic control circuit aforementioned, the first through fifth ON-OFF solenoid valves 71-75 are operated in accordance with the combination as shown in Table 2 to get the first through fifth stages for forward movement and a reverse stage. In Table 2, (1), (2) show the first and second stage under engine braking range respectively.

TABLE 2

| ON-OFF SOL. VALVE | P | R | N | D. 3. 2. 1. | | | | | | |
|---|---|---|---|---|---|---|---|---|---|---|
| | | | | 1 | (1) | 2 | (2) | 3 | 4 | 5 |
| MAIN TRANSMISSION | | | | | | | | | | |
| FIRST | OFF | OFF | OFF | ON | ON | ON | ON | OFF | OFF | OFF |
| SECOND | OFF | OFF | OFF | OFF | OFF | OFF | OFF | ON | ON | ON |
| THIRD | OFF | OFF | OFF | OFF | ON | OFF | ON | ON | ON | OFF |
| SUB TRANSMISSION | | | | | | | | | | |
| FOURTH | OFF | OFF | OFF | OFF | OFF | ON | ON | OFF | ON | ON |
| FIFTH | OFF | OFF | OFF | OFF | OFF | OFF | OFF | OFF | ON | ON |

Next, there will be explained a relationship between the ON-OFF combination of the solenoid valves 71 and 75 and shift stages.

In the first stage in which the engine brake as employed in other ranges such as D range does not work, the first, second and third solenoid valve 71, 72 and 73 are ON, OFF and OFF in the main transmission and the spools of the first through the third shift valves 61 through 63 are positioned at left, right and right positions. In this condition, line 121 separated from the forward line 52 is communicated with line 122 through first shift valve 61 and with line 123 through the second shift valve 62 but the line 123 is interrupted by the third shift valve 63. Line 124 separated from the line 52 is interrupted by the second shift valve 62 and line 125 separated from the main line 42 is interrupted by the first shift valve 61. Thus, only the forward clutch 23 is engaged so that the low speed stage is established without working the engine brake in the main transmission 20.

In the sub-transmission, the fourth and fifth solenoid valves 74 and 75 are OFF and the spools of fourth and fifth shift valves 64 and 65 are shifted to the right position so that the main line 42 is communicated with the line 108 through the line 107 and the fourth shift valve 64 and with line 109 which is connected with the reduction brake control valve 102 through the fifth shift valve 65 to supply the line pressure to the control valve 102. In this case, the control pressure produced by the second linear solenoid valve 103 is introduced into port 102a through the line 104, fifth shift valve 65 and line 105. As a result, the line pressure is adjusted by the control pressure to form the predetermined engaging pressure which is introduced into the second chamber 342 to engage the speed reduction brake 34.

The first chamber 321 of the direct clutch 32 is communicated with a drain port of the fourth shift valve 64 through control valve 101 and line 111 and the second chamber 322 is communicated with a drain port of the fifth shift valve 65 so that the direct clutch 32 is held to be disengaged. As a result, the shift stage of the sub-transmission is the low speed stage in which the engine brake is operative. But, the automatic transmission as a whole establishes the first stage with no engine brake operation.

In the first stage in which the engine brake is operative as employed in specific range such as first and second range, the third solenoid valve 73 is turned ON in the main transmission 20 for the first stage with no engine brake. As a result, the spool of the third shift valve 63 is moved to the left position. Thus, the line 52 is communicated with line 126 which is connected with the control valve 78 through the separated line 121, first shift valve 61, line 122, second shift valve 62, line 123 and third shift valve 63 to supply the line pressure to the control valve 78. Then, the line pressure introduced into the valve 78 is adjusted to the engaging pressure in accordance with the control pressure which is introduced into the control port 78a through the first linear solenoid valve 80 and line 81 and supplied to the low-reverse brake 29 through line 127. As a result, the brake 29 is engaged in addition to the forward clutch 23 so that the low speed stage is obtained with engine brake operation in the main transmission 20. In this case, the reduction speed brake 34 is kept engaged as well as the first stage no engine brake operation. Thus, the first stage with engine brake operation is now established in the automatic transmission as a whole.

Next, in the second shift stage with no engine brake operation as employed in D range and the like, and second shift stage with engine brake operation as employed in 1 and 2 ranges and the like, only the shift stage in the sub-transmission 30 is changed for the first shift stages with and without engine brake operation respectively.

In detail, the fourth solenoid valve 74 is turned ON in the sub-transmission 30 to place the spool of the fourth shift valve 64 at the left position. The line pressure which is introduced into the fourth shift valve 64 from the main line 42 through line 107 is introduced into the direct clutch control valve 101 through the shift valve 64 and line 111. The start-up characteristics of the line pressure is controlled by the control valve 101 and introduced into the first chamber 321 of the direct clutch 32 through line 113, fifth shift valve 65 and line 106. Thus, the shift stage in the sub-transmission 30 is switched to the high speed shift stage so that the second shift stages with or without engine brake operation can be established.

In the third shift stage, the first through third solenoid valves are turned OFF, ON, ON respectively to place the spools of the first through third shift valves 61 through 63 at the right, left, left positions respectively. In this case, the divided line 121 from the forward line 52 is communicated with line 128 through the first shift valve 61, and with line 129, which is connected with the coast brake control valve 77, through the third shift valve 63. Thus, the line pressure is supplied to the control valve 77 to be adjusted in accordance with the control pressure which is introduced through the first linear solenoid valve 80 and line 81, and introduced into the coast brake 29 through line 130 to engage the coast brake 29.

The other divided line 124 from the forward line 52 is communicated through the second shift valve 62 with line 131 which is connected with the 3-4 brake control valve 79 so as to provide the line pressure. To the control valve 79 is introduced the control pressure from the first linear solenoid valve 80 through the line 81 and the engaging pressure to the coast brake 29 is introduced thereto as the control pressure so that the engaging pressure is introduced into the 3-4 brake 28 through line 132.

As a result, in the main transmission 20, the 3-4 brake is engaged in addition to the forward clutch 23 to establish the middle speed stage with engine brake operation.

In the sub-transmission, both the fourth and fifth solenoid valves 74 and 75 are OFF to hold the low speed stage with engine brake operation as well as the first shift stage. Thus, the automatic transmission as a whole establishes the third shift stage of a predetermined speed reduction ratio with engine brake operation.

In the fourth shift stage, the fourth and fifth solenoid valve are turned ON to place the spools of the fourth and fifth shift valves 64 and 65 at the left position. As a result, the line pressure is introduced through the main line 42, line 107, fourth shift valve 64 and line 111 into the direct clutch control valve 101 so that the start-up characteristics is adjusted at a predetermined pressure. The adjusted pressure is introduced into the second chamber 322 from the line 113 and shift valve 65 through the line 114. As a result, the direct clutch 32 is engaged to switch the sub transmission to the high speed stage. In this case, since the main transmission is kept at the middle speed stage as well as the third shift stage, the automatic transmission as a whole establishes the fourth shift stage.

In the fifth shift stage, the first through third solenoids 71-73 are turned OFF, ON, OFF in the main transmission 20 to place the spools of the first through third shift valves 61-63 at the right, left, right positions. Thus, the line 125 separated from the main line 42 is communicated with line 133 through the first shift valve 61 and with line 134, which is connected with the control valve 76, through the third shift valve 63 so that the line pressure is introduced into the control valve 76. The engaging pressure adjusted by the control valve 76 is introduced into the direct clutch 24 through the line 82 to engage the clutch 24. As a result, in the main transmission 20, the forward clutch 23 and the direct clutch 24 are engaged to switch the shift stage to the high speed stage. When the direct clutch 24 is engaged, the engaging pressure is provided to have a stepped value.

On the other hand, in the sub-transmission 30, the fourth and fifth solenoid valve 74 and 75 are kept ON to hold the high speed stage. As a result, the automatic transmission as a whole establishes the fifth shift stage.

In the reverse stage in which the manual valve 43 is operated to the reverse range R, the reverse line 53 is communicated with the main line 42 through the manual valve and the first through the third solenoid valve 71-73 are turned OFF, OFF, OFF to place the spools of the first to third shift valves 61-63 at the right positions. As a result, the line 125 separated from the main line 42 is communicated with line 133 through the first shift valve 61 as well as the fifth shift stage as aforementioned, further with line 134, which is connected with the direct clutch control valve 76, through the third shift valve 63 to introduce the line pressure to the control valve 76. In this case, the line pressure is introduced into the port 76b through the line 86 from the line 53 so as to shift the spool of the valve 76 at the left position in the drawing. Thus, the line pressure introduced from the line pressure is directly introduced into the direct clutch 24 without reducing the pressure. This means that the direct clutch 24 is engaged with a high engaging pressure.

The reverse line 53 is communicated with the low-reverse brake control valve 78 through line 136 on which an orifice providing different flow rate depending on the flowing direction is disposed, the third shift valve 63 and the line 126 to introduce the line pressure to the control valve 78 as well as the first shift stage with the engine brake operation. In this case, to the port 78b of the valve 78 is introduced the line pressure through the line 86 divided from the reverse line 53 to place the spool of the control valve 78 at the left position in the drawing. Thus, the line pressure from the line 126 is introduced to the low-reverse brake 26 without adjusting the value to engage the low-reverse brake 26 with the high engaging pressure.

As a result, in the main transmission, the direct clutch 24 and the low-reverse brake 26 are engaged to establish the reverse stage. In the sub-transmission, the fourth and fifth solenoid valve 74 and 75 are kept OFF and the shift stage is set at the low speed stage with the engine brake operation so that the reverse stage with a large reduction ratio is established.

When the engaging pressure is introduced into the low-reverse brake 26, the hydraulic fluid is introduced to the fourth accumulator 90 through lines 136 and 137 to gradually increase the engaging pressure with a certain stepped value.

In addition to the above structure, the hydraulic pressure 40 is provided with lock-up first and second shift valves 141 and 142 and lock-up control valve 143 for controlling the lock-up clutch 17 of the torque converter 10.

The converter line 144 is connected with the first shift valve 141 and control valve 143 from the main line 42. The control line 66 is connected with the control port 141a at the one end of the first shift valve 141 from the second reducing valve 45 through line 145 on which ON-OFF solenoid valve 146 is disposed for lock-up control. When the valve 146 is OFF, the control pressure is introduced into the control port 141a of the first shift valve 141 to place the spool of the valve 141 at the left position. In this case, release line 147 which is connected with the lock-up release chamber 17a of the torque converter 10 is brought into communication with the converter line 144 to release the lock-up clutch 17.

On the other hand, the solenoid valve 146 is turned ON to drain the control pressure from the control port 141a of the valve 141 to place the spool of the valve 141 at the right position so that the converter line 144 is brought into communication with engaging line 148 which is connected with lock-up engaging chamber 17b to engage the lock-up clutch 17. In this case, the release line 147 is brought into the lock-up control valve 143 through the first shift valve 141 and line 149 so that the wording hydraulic pressure adjusted by the control valve 143 is supplied to the releasing chamber 17a of the clutch 17 as lock-up releasing pressure.

In detail, to the control port 143a of the control valve 143 is connected control line 150 from the first reducing valve 44. On the line 150 is disposed a duty solenoid valve 151 which control the control pressure in accordance with the duty ratio to control the releasing pressure.

The control pressure adjusted by the duty solenoid valve 151 is also introduced into the control port 142a of the second shift valve 142 through line 152. When the control pressure is lower than a predetermined value, the spool of the second shift valve 142 is shifted to the right position so that the line pressure is introduced into the port 143b for suspending the pressure adjustment by communicating the line 153 connected to the main line 42 through line 56 and through line 154 to supply the line pressure to the port 143b. As a result, the control valve 143 is kept from controlling the releasing pressure and the lock-up clutch 17 is fully engaged since only the engaging pressure is introduced into the lock-up clutch 17.

When the control pressure is increased beyond the predetermined value, the control valve 143 starts to adjust the releasing pressure to make so-called slip control of the lock-up clutch 17.

In this case, the spool of the second shift valve 142 is placed at the right position when the control pressure is not introduced to open the line 155 which bypasses the orifice 54 on the line 52 connecting the forward clutch 23.

Figure 5:
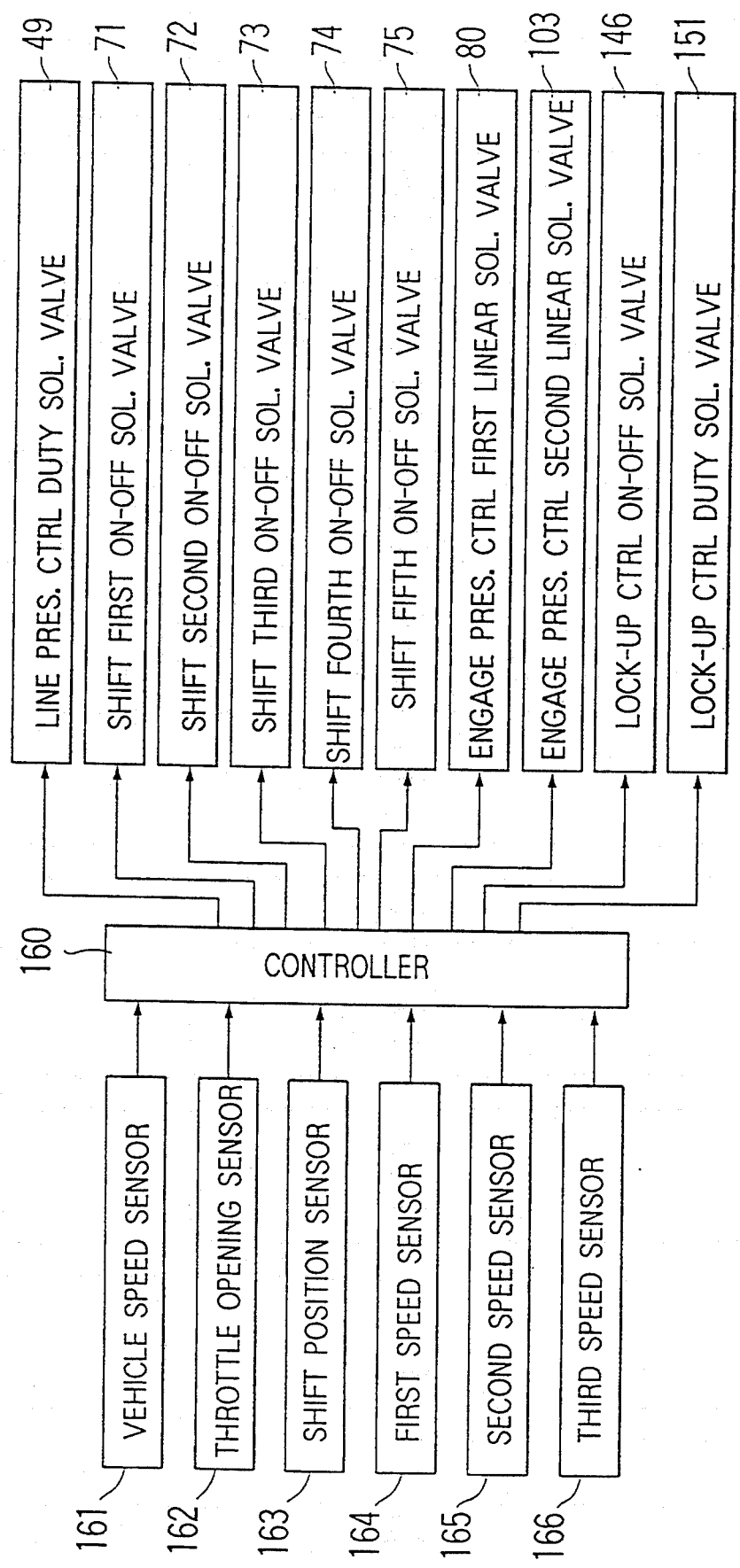
FIG. 5 is a block chart of a control system for the automatic transmission.

The duty solenoid valve 49 in the control circuit 40 for controlling the line pressure, first -fifth solenoid valves 71–75, first and second linear solenoid valve 80, 103 for controlling the engaging pressure, solenoid valve 146 for controlling the lock-up and duty solenoid valve 151 are controlled by the control signal from the controller 160 as shown in FIG. 5. The controller 60 receives signals from vehicle speed sensor 161, throttle opening sensor 162, shift range sensor 163 for sensing the shift position (range) selected by the driver and the like to control the solenoid valves. To the controller is connected a first speed sensor 164 for sensing a rotation speed of the input speed of the main transmission 20, a second speed sensor 165 for sensing the output speed of the main transmission (input speed of the sub-transmission 30) and third speed sensor 166 for sensing output speed of the sub-transmission 30. The controller 160 calculates the gear ratio of the main and sub-transmissions 20 and 30 based on the signals from the sensors 164–166 to control the engaging pressure.

As aforementioned, the direct clutch 32 in the sub-transmission 30 is engaged in the 1-2 shift operation and 3-4 shift operation. In this case, the 1-2 shift operation is made when the main transmission 20 is in the low speed stage and the 3-4 shift operation is made when the main-transmission 20 is in the middle speed stage. Thus, the input torque value to the direct clutch 32 is greatly different between the two shift operations.

In view of this, as shown in FIG. 2, there are provided the first hydraulic chamber 321 of larger pressure area and second hydraulic chamber 322 of smaller pressure area. When the 1-2 shift operation is made, the engaging pressure is introduced into the first chamber 321. When the 3-4 shift operation is made, the engaging pressure is introduced into the second chamber 322.

Figure 6:
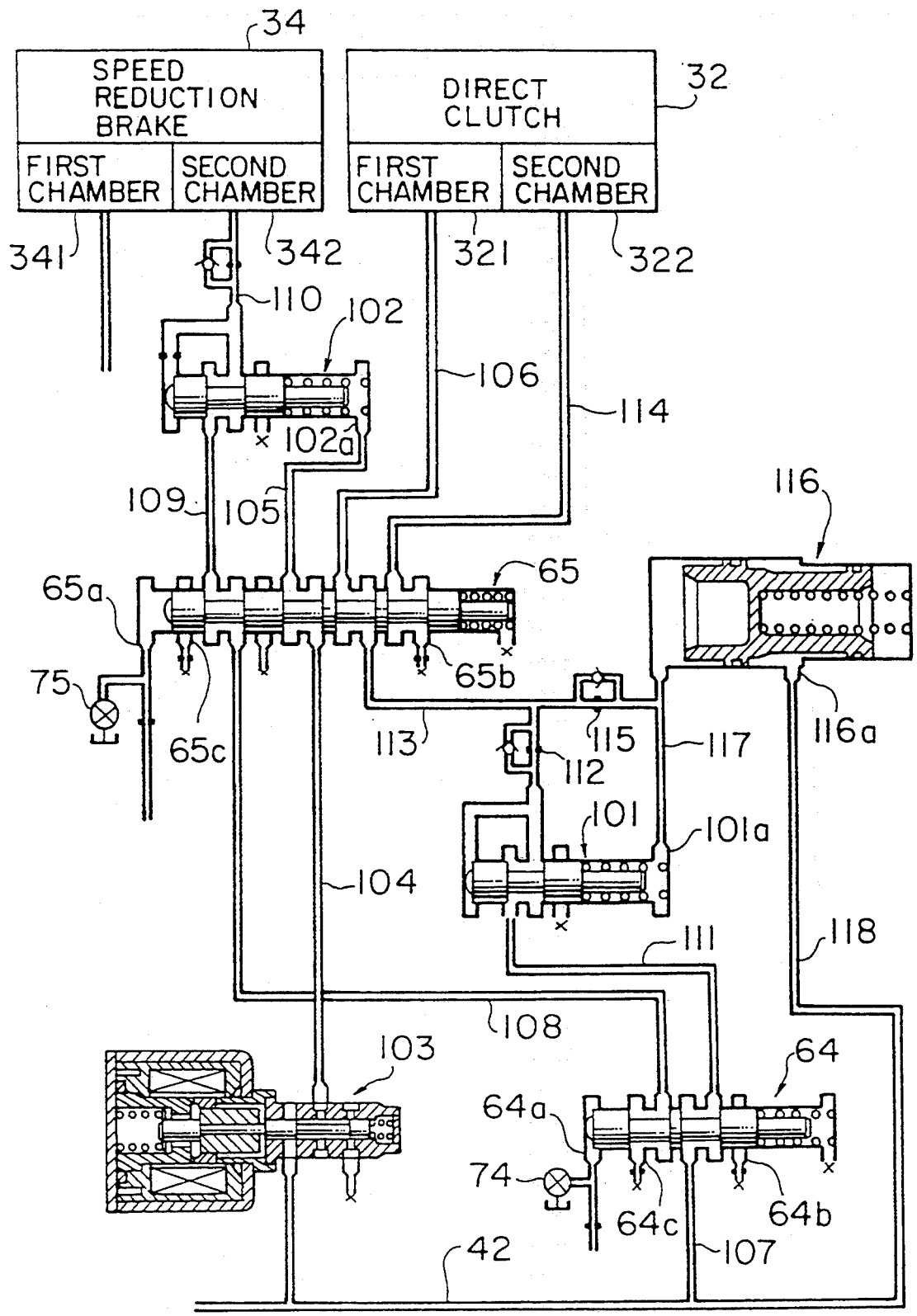
FIG. 6 is a hydraulic control circuit showing a condition in the 1-2 shift operation of the sub-transmission.

Detailed explanation for this will be made taking accordance with FIGS. 6 and 7.

In the first shift stage, the fourth and fifth solenoid valves 74 and 75 are kept OFF in the sub-transmission 30 to place the spools of the fourth and fifth shift valves 64 and 65 so that the line pressure is introduced into the speed reduction brake control valve 102 through the main line 42, line 107, fourth shift valve 64, line 108, fifth shift valve 65 and line 109, and adjusted by the control valve 102 in accordance with the control valve from the second linear solenoid valve 103 to be suppled to the second chamber 342 of the speed reduction brake 34 to engage the speed reduction brake 34 so as to establish the low speed stage.

In this case, the first chamber 321 is communicated with the first drain port 64b of the fourth shift valve 64 through line 106, fifth shift valve 65, line 113, direct clutch control valve 101 and line 111 and second chamber 322 is communicated with the first drain port 65b of the fifth shift valve 65 to release the clutch 32.

When the shift operation is made from the first shift stage to second stage, the fourth and fifth solenoid valves 74 and 75 are turned ON and OFF respectively to place the spool of the fourth shift valve 64 at the left position and place the spool of the fifth shift valve 65 at the right position. As shown in FIG. 6, the line pressure introduced into the fourth shift valve 64 from the main line 42 through the line 107 is introduced into the direct clutch control valve 101 through the fourth shift valve 64 and line 111 and further into the first chamber 321 of the direct clutch 32 through the one way orifice 112, line 113 and fifth valve 65 and line 106 from the control valve 101. In this case, the second chamber 322 is communicated with the second drain port 64c of the fourth shift valve 64 through the line 110, speed reduction brake control valve 102, line 109, fifth 65 and line 108 to release the speed reduction brake 34.

As a result, the sub-transmission is switched to the high speed stage to complete the 1-2 shift operation. In supplying the engaging pressure to the first chamber 321 of the direct clutch 32 in the 1-2 shift operation, the start-up pressure characteristics is controlled as follows.

In detail, the line pressure introduced into the direct clutch control valve 101 from the fourth shift valve 64 is adjusted in accordance with the control pressure in the control port 101a. To the control port 101a is introduced the hydraulic fluid which is discharged by the control valve itself is suppled as the control pressure through line 177, one way orifice 112, 115 and accumulator 116. Thus, the control pressure and the engaging pressure which is adjusted in correspondence with the control pressure is increased gradually to have a shelf value where the hydraulic pressure is temporarily held at a substantially constant value in the start-up condition as shown by reference a in FIG. 8.

The engaging pressure adjusted as aforementioned is supplied to the first chamber 321 of larger pressure area of the direct clutch 32. As a result, the direct clutch 32 is engaged with a large engaging pressure when a larger torque is transmitted to the direct clutch 32 as shown by reference b in FIG. 8. Thus, the direct clutch 32 is engaged by the large engaging force in accordance with the torque amount transmitted therethrough. As a result, it can be eliminated that the 1-2 shift operation takes long because of the shortage of the engaging force compared with the torque amount to be transmitted therethrough. After the completion of the full engagement of the direct clutch 32, a torque transmission capacity corresponding to the torque transmitted therethrough can be obtained.

Then, in the 2-3 shift operation, the 3-4 brake 28 is engaged in the main transmission 20 and the direct clutch 32 engaged as aforementioned is released in the sub-transmission and the speed reduction brake 34 is engaged to establish the low speed stage as well as the first shift stage therein. Next, from this condition, the sub-transmission is switched to the high speed stage again to make the 3-4 shift operation.

In the 3-4 shift operation, the fourth and fifth solenoid valve 74 and 75 of OFF, OFF conditions are switched to ON, ON condition to place the spools of the fourth and fifth shift valves 64 and 65 at the left positions. This is different from the 1-2 shift operation where the spool of the shift valve 65 is located at the right position.

Figure 7:
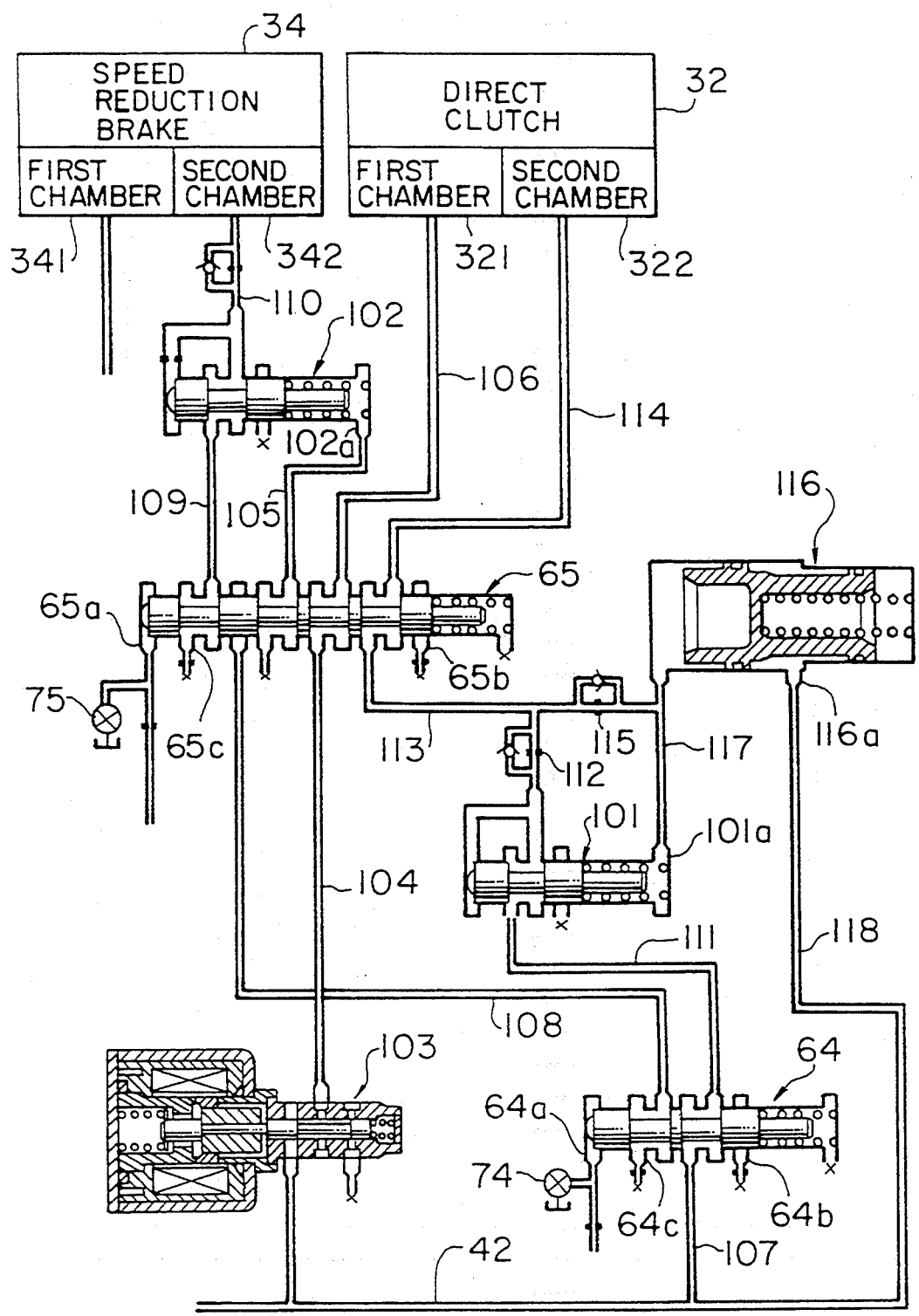
FIG. 7 is a similar view to FIG. 6 but showing the 3-4 shift operation.

As shown in FIG. 7, in the fourth shift stage, the line pressure introduced into the fourth shift valve 64 from the main line 42 through line 104 is introduced into the direct clutch control valve 101 through the fourth shift valve 64, line 111, and adjusted by the control valve 101 as well as the 1-2 shift operation and after being controlled the start-up characteristics by the accumulator 116 and the like and thereafter introduced into the fifth shift valve 65. In this case, the spool of the shift valve 65 is placed at the left position so that the control pressure is introduced into the second chamber 322 of the smaller pressure area of the direct clutch 32. Concurrently, the second chamber 342 of the speed reduction brake 34 is communicated with second drain port 65c of the fifth shift valve 65 through line 110, speed reduction brake control valve 102 and line 109 to disengage the speed reduction brake 34.

As a result, the 3-4 shift operation is completed. This shift operation is made under a relatively small torque amount to be transmitted therethrough because the main transmission 20 is kept in the middle speed stage and the input torque from the main transmission 20 to the sub-transmission is relatively small. In response to this situation, the direct clutch 32 is engaged with a relatively small engaging pressure as shown by reference c in FIG. 8. As a result, a torque shock due to an excessive engaging pressure compared with the torque amount to be transmitted therethough can be suppressed as low as possible when the shift operation is made.

As aforementioned, the input torque to the sub-transmission 30 is different between the second and fourth shift staged. In engaging the direct clutch 32 under the respective shift stages, the control valves 101, accumulator 116, and lines 111, 113, 117, 118 and one-way orifice 112, 115 and the like are operatively associated. The engaging pressure for the direct clutch 32 controlled depending on the input torque to the sub-transmission 30 appropriately. After completion of the engagement of the direct clutch 32, the torque transmission capacity of the sub-transmission 30 is provided in accordance with the actual amount of torque transmission.

The engaging pressure introduced into the first chamber 321 at the 1-2 shift operation is discharged at the 2-3 shift operation. In this case, the fifth solenoid valve 75 is temporarily turned ON to place the spool of the fifth valve 65 at the left position so that the discharge of the engaging pressure is made from the fifth shift valve 65 through the line 104 and second linear solenoid valve 103.

The controller 160 show in FIG. 5 controls the releasing action of the direct clutch 32 in the sub-transmission 30 by means of the second solenoid valve 103 in order to increase the gear ratio of the sub transmission 30 in response to the reduction in the gear ratio in the main transmission when the shift stage is switched from the low speed stage to the middle speed stage.

In detail, the controller 160 calculates the gear ratio of the main transmission 20 based on the first and second speed sensor 164 and 165 disposed on the input and output member of the main transmission 20 and sets a target gear ratio of the sub-transmission 30 to increase as that of the main transmission is reduced. The controller 160 compares the target gear ratio with the actual gear ratio calculated based on the signals from the second and third speed sensors 165 and 166 to make a feedback control for the releasing action of the direct clutch 32 by means of the second linear solenoid valve 103.

Thus, the sub-transmission 30 is switched from the high speed stage to the low speed stage to increase the gear ratio thereof (shift down) as the gear ratio of the main transmission 20 is reduced (shift up) so that the 2-3 shift operation is smoothly made.

In this embodiment, as shown in FIG. 2, the direct clutch 32 is formed with the first and second chambers 321 and 322 in tandem by means of the first piston 32e of larger diameter and the second piston 32f of smaller diameter behind the first piston 32e. This structure is compact in comparison with the speed reduction brake 34 which is formed coaxially with the first and second chamber 341 and 342 in which the piston 34d thereof is relatively large in diameter. The first piston 32e of the direct clutch 32 is sealed by means of lip seals 32h and 32i having a low friction coefficient so that the releasing action of the direct clutch 32 can be properly made.

Hereinafter, there will be explained another shift control by means of the controller 160 taking reference with FIG. 9. Meanwhile, the shift operation may be made from the second to fourth shift stages. For example, if the acceleration pedal is stroked in the second shift stage and then is abruptly released, the shift stage will be switched from the second to the fourth stage skipping the third stage. In another case, if the second stage is held in a hold mode and if the hold mode is released, the same shift operation would occur. In the illustrated control, the controller 160 establishes an intermediated control pattern under such specific shift operation.

In the intermediate control pattern or transient control pattern, the fourth and fifth solenoid valves 74 and 75 are switched from ON, OFF to ON, ON and the second linear solenoid valve 103 is turned OFF. As a result, the line pressure is introduced directly to the first chamber 321 of the direct clutch 32 without any adjustment through the second linear solenoid valve 103, line 104, fifth shift valve 65 and line 106. Thus, the engaging pressure is introduced into both the first and second chambers 321 and 322 to keep the clutch 32 engaged.

Figure 8:
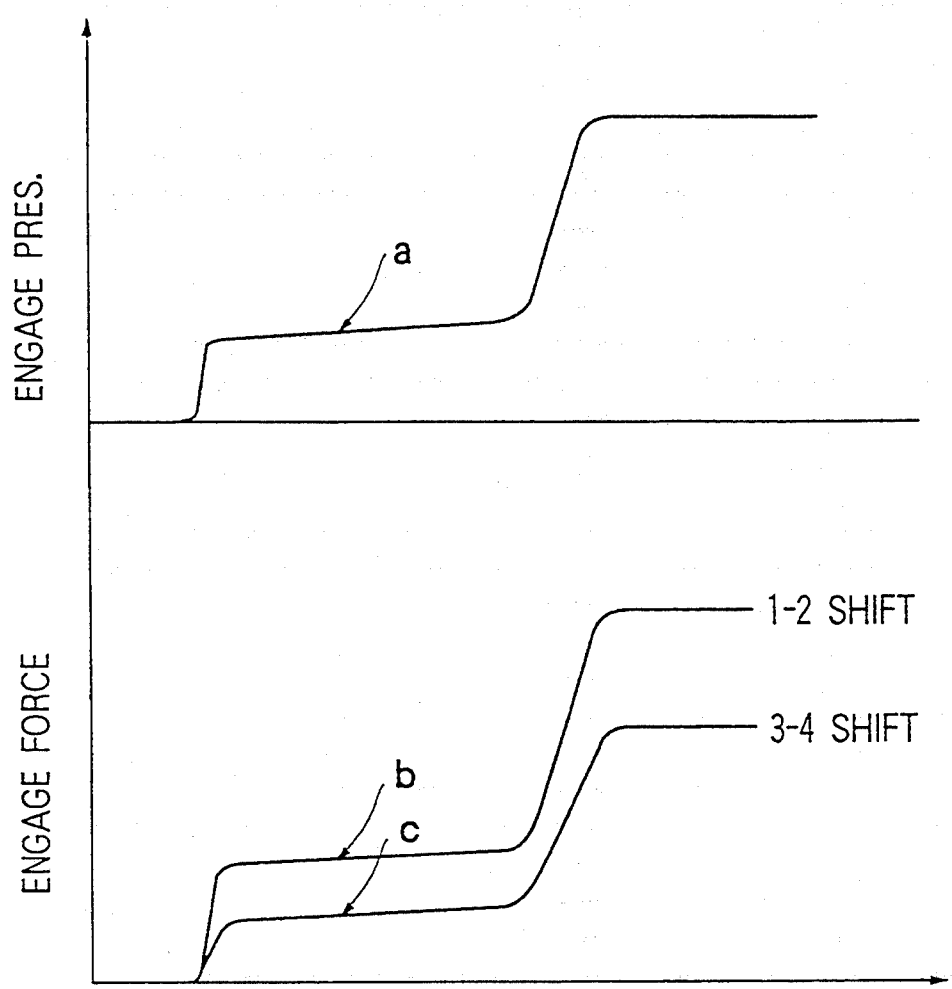
FIG. 8 is a graphical representation showing a start up characteristics of the engaging force and pressure for the direct clutch.
Figure 9:
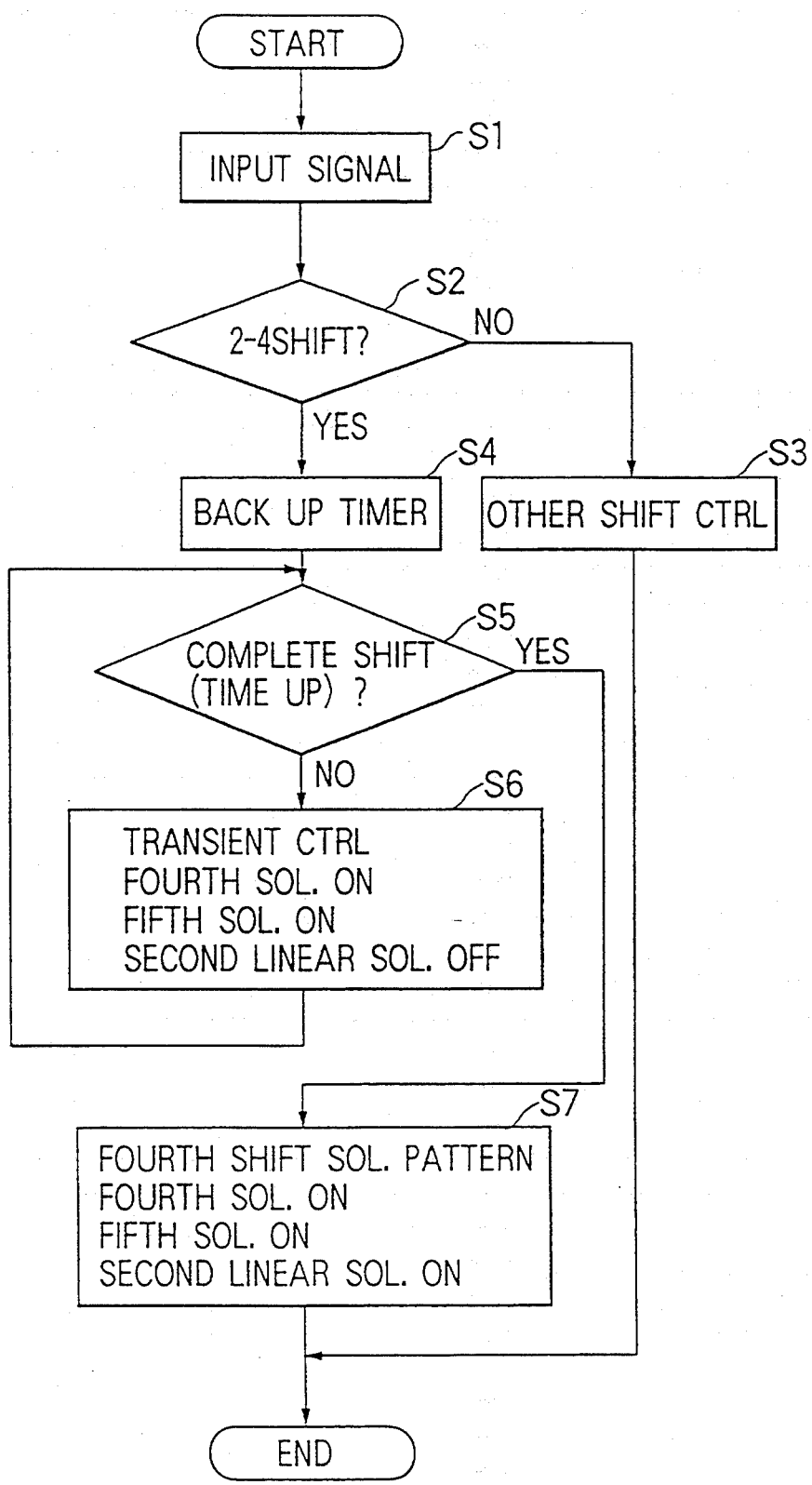
FIG. 9 is a flow chart of the shift control in accordance with another embodiment.
Figure 10:
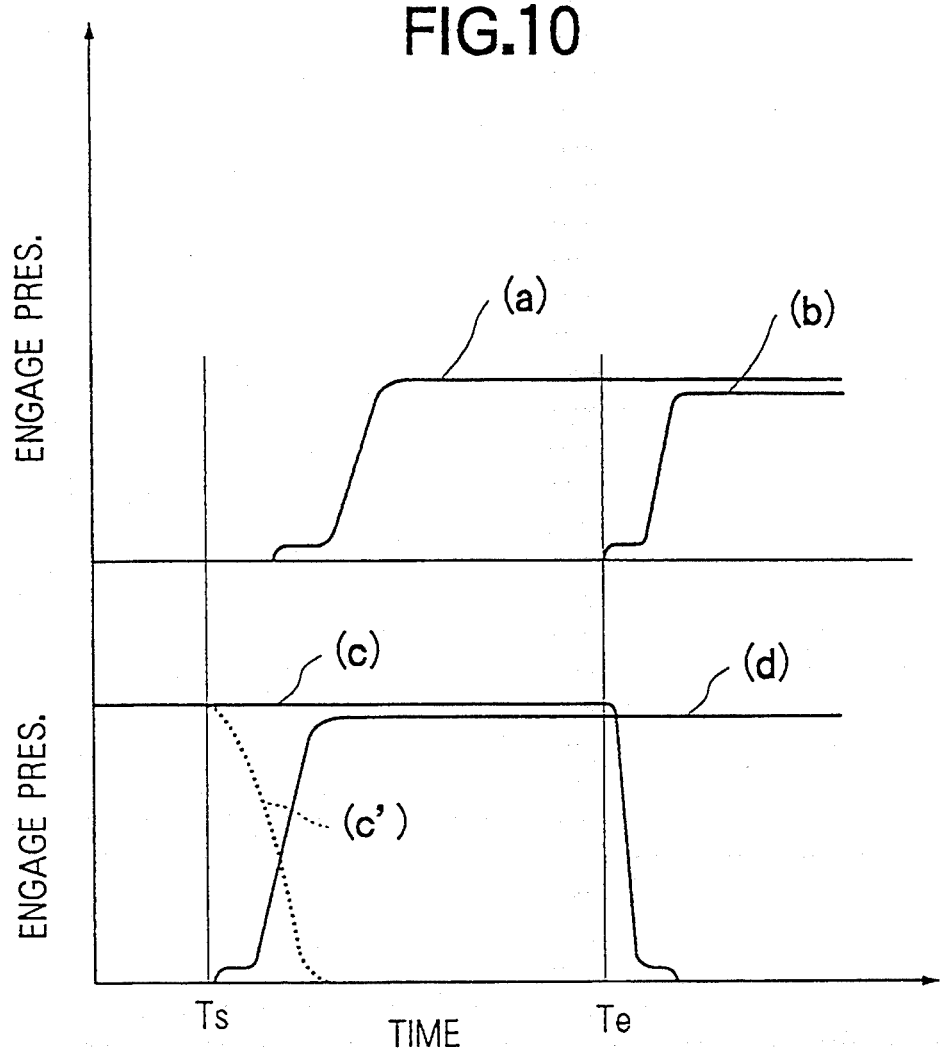
FIG. 10 is a graphical representation showing a change of the engaging pressure for the main and sub transmissions in the 2-4 shift operation in accordance with the embodiment of FIG. 9.
Figure 11:
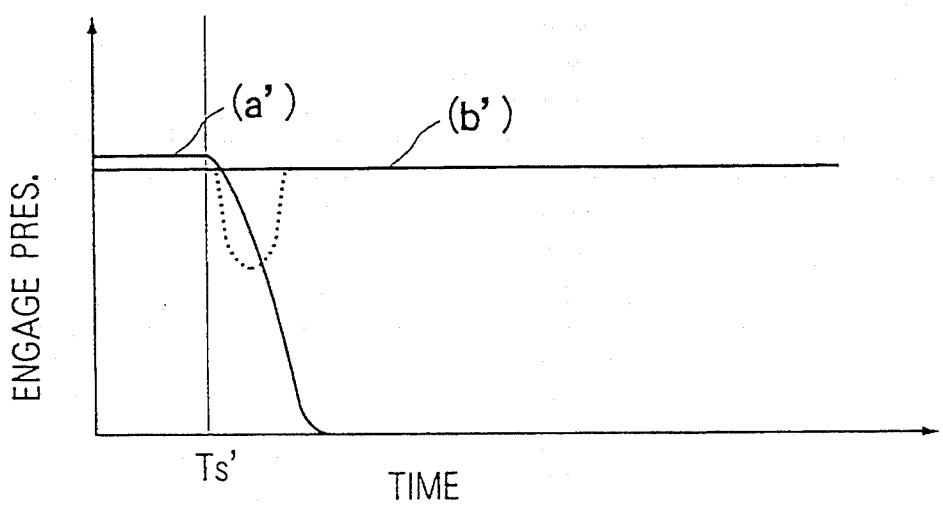
FIG. 11 is a graphical representation showing a change of the engaging pressure in a shift operation in accordance with still another embodiment.

Referring to the flow chart shown in FIG. 9, the controller 160 reads signals from the sensors 161–166 (step S1) and judges whether or not the 2-4 shift command has been made based on the signals in step S2. If the judgment is NO, or if the transmission is not under the 2-4 shift operation, the controller 160 carries out the other shift control (step S3). If the judgment in step S2 is YES or if the 2-4 shift command has been made, the controller 160 sets a backup timer for completing the shift operation within a predetermined time period in step S4. Next, the controller 160 calculates the gear ratio of the main transmission 20 based on the sensors 164 and 165 and judges whether the shift operation is completed or the timer is counted out in step S5. The controller continues a transient control in step S6 until the judgment in step S5 is switched to YES. As shown in FIG. 10, the engaging pressure is introduced to the 3-4 brake of the main transmission 20 after a time period Ts with increasing characteristics to have a shelf pressure where the engaging pressure is temporarily hold for a certain time period as shown by a line (a). Thereafter, the engaging pressure for the coast brake of the main transmission 20 is introduced in a manner that the increasing characteristics of the hydraulic pressure have a shelf value after a time period Te. From the time Ts to Te, the transient control is carried out in which the fourth and fifth solenoid valve 74 and 75 are held ON and the second linear solenoid 103 is turned OFF. Thus, the engaging pressure is introduced into both the first and second chambers 321 and 322 of the direct clutch 32 of the sub-transmission 30 after the 2-4 shift command as shown in FIG. 8 (c), (d).

In step S5, the judgment is YES, or if the 2-4 shift operation is completed or if the backup timer is counted out, the fourth and fifth solenoid valve 74 and 75 are held ON, ON and the second linear solenoid valve is turned ON so that the engaging pressure of the first chamber 321 is drained to end the control.

As aforementioned, the engaging pressure is introduced into the first chamber 321 of the larger pressure area of the sub-transmission 30 to engage in the second shift stage in which a larger amount of torque is transmitted through the transmission. On the other hand, the engaging pressure is introduced into the second chamber 322 of the smaller pressure area of the sub-transmission 30 to engage in the fourth shift stage in which a smaller amount of torque is transmitted though the transmission.

Thus, the direct clutch 32 is engaged by characteristics through respective engaging pressure provided in accordance with the amount transmitting torque needed in the respective shift stages.

According to the above control, the hydraulic pressure of the first chamber 321 is released after the completion of the introduction of the hydraulic pressure into the second chamber 322. Thus, it is prevented that the hydraulic pressure in the first chamber 321 is discharged before the hydraulic pressure is completely introduced into the second chamber 322 as shown by a broken line (c') in FIG. 10. Otherwise, this condition shown by the line (c') will result in a temporary neutral condition. According to the illustrated embodiment, the engine racing or other racing condition can be avoided.

Further, in the illustrated structure, it is possible to control the number of the hydraulic chambers to which the hydraulic pressure is introduced among a plurality of hydraulic chambers formed therein so as to make the engaging pressure control at the time of the switching of the frictional element. In this case, the engaging pressure is introduced into all of the chambers when a shift stage of a large amount of the torque transmission is established. On the other hand, the engaging pressure is introduced into some of the chambers when a shift stage of a smaller amount of the torque transmission is established. If the shift stage is switched from one to the other wherein the frictional element is kept engaged but changed in the amount of the torque transmission, hydraulic pressure is discharged from one chamber as shown by a line (a') but is kept in the other chamber as shown by a line (b'). Thus, even when the shift operation is made, the frictional element is kept engaged by the smaller engaging pressure. Thus, it is prevented that the engaging pressures in all of the chambers are reduced as shown by a broken line, which means that a temporary neutral condition is produced during the shift operation.

In another modification, the forward clutch 23 can be constituted by a similar structure to the hydraulic control structure of multiple hydraulic chambers of the direct clutch 32 so that the same effect as the shift operation involving the direct clutch 32 can be obtained. Thus, the temporary neutral condition as aforementioned can be avoided.

Figure 12:
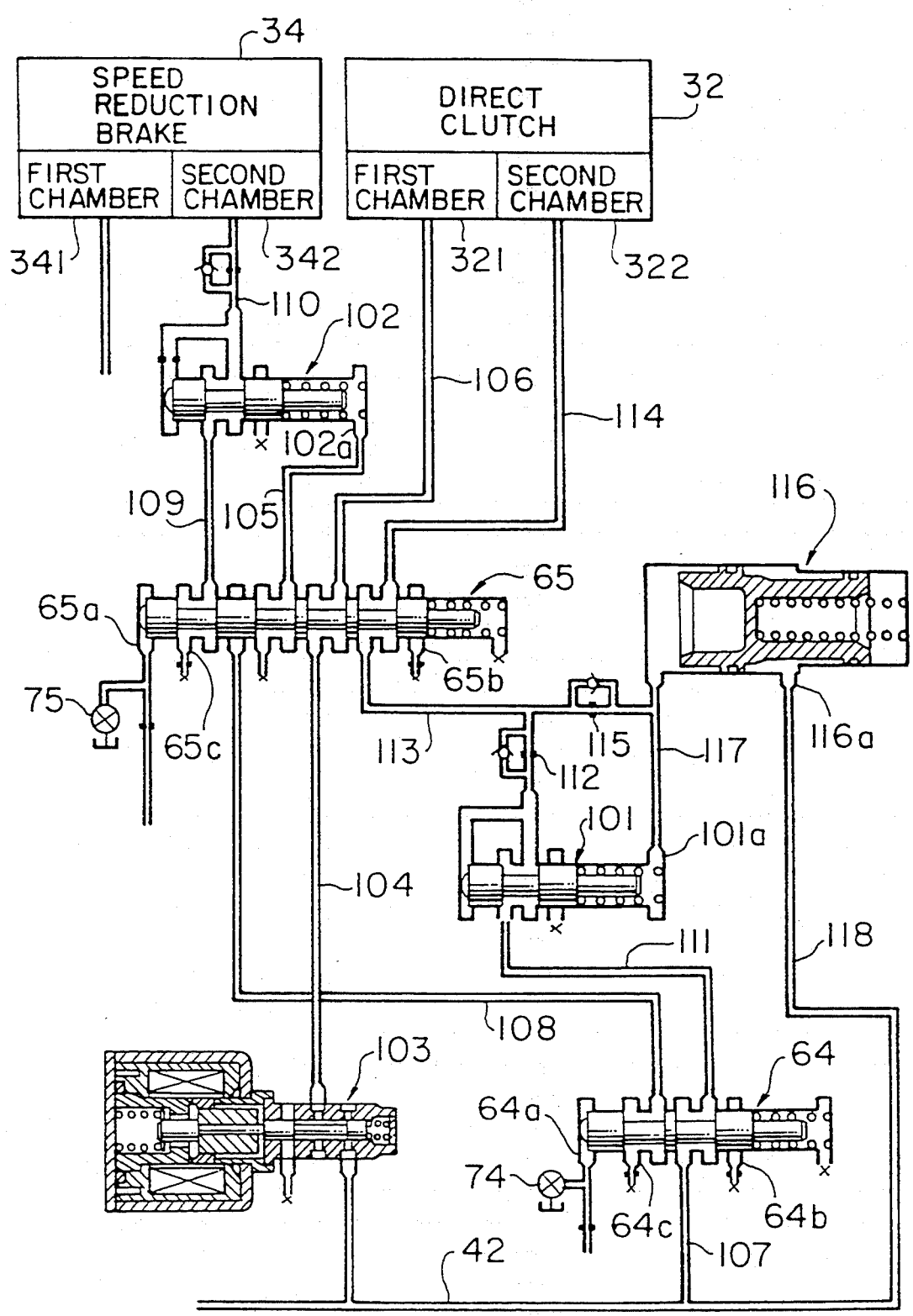
FIG. 12 is a hydraulic circuit showing a condition in the 3-4 shift operation in accordance with another embodiment.

Hereinafter, there will be explained still another shift control in the 4-3 shift operation. As shown in FIG. 12, in the fourth shift stage, the line pressure introduced into the fourth shift valve 64 from the main line 42 through line 104 is introduced into the direct clutch control valve 101 through the fourth shift valve 64, line 111, and adjusted by the control valve 101 as well as the 1-2 shift operation and after being controlled the startup characteristics by the accumulator 116 and the like and thereafter introduced into the fifth shift valve 65. In this case, the spool of the shift valve 65 is placed at the left position so that the control pressure is introduced into the second chamber 322 of the smaller pressure area of the direct clutch 32. Further, the power supply to the second linear solenoid valve 103 is interrupted, so that the line pressure from the main line 42 is introduced into the first chamber 321 to engage the direct clutch 32. Concurrently, the second chamber 342 of the speed reduction brake 34 is communicated with second drain port 65c of the fifth shift valve 65 through line 110, speed reduction brake control valve 102 and line 109 to disengage the speed reduction brake 34.

In the illustrated embodiment, there is provided another intermediate control pattern or transient control pattern in response to the 4-3 shift operation.

The intermediate control pattern is established in the transitional condition from the fourth to third shift stage wherein the fourth and fifth solenoid valve 74 and 75 which are turned ON, ON in the fourth stage are turned OFF, OFF in the third shift stage. In the intermediate control pattern, only the fourth solenoid valve 74 is turned OFF. The second linear solenoid valve 103 which is turned OFF receives the power supply to control the discharge of the engaging pressure of the direct clutch 32 wherein the engaging pressure had been introduced into both chambers 321 and 322 in the fourth shift stage.

Figure 13:
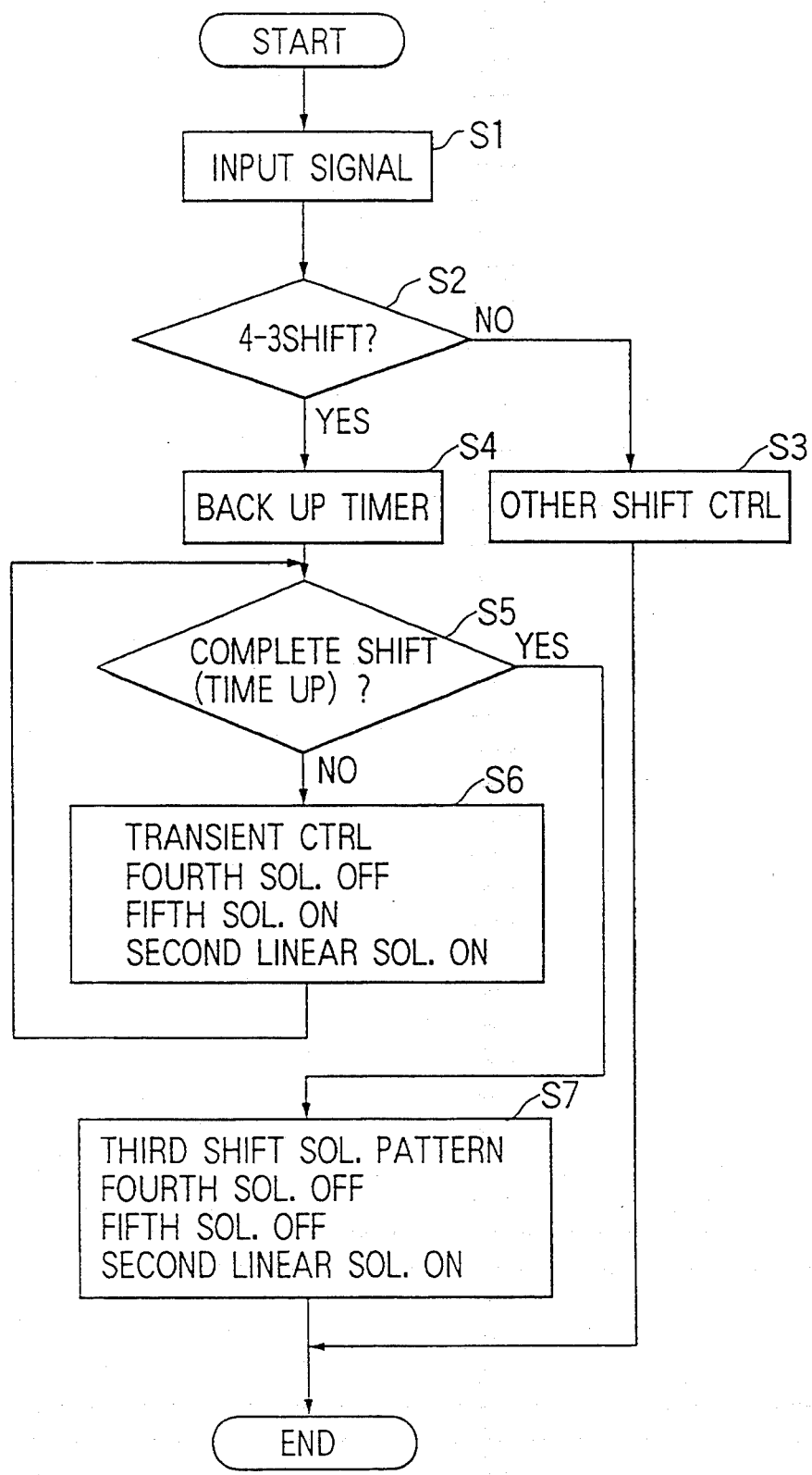
FIG. 13 is a flow chart showing a hydraulic control in accordance with the embodiment of FIG. 12.
Figure 14:
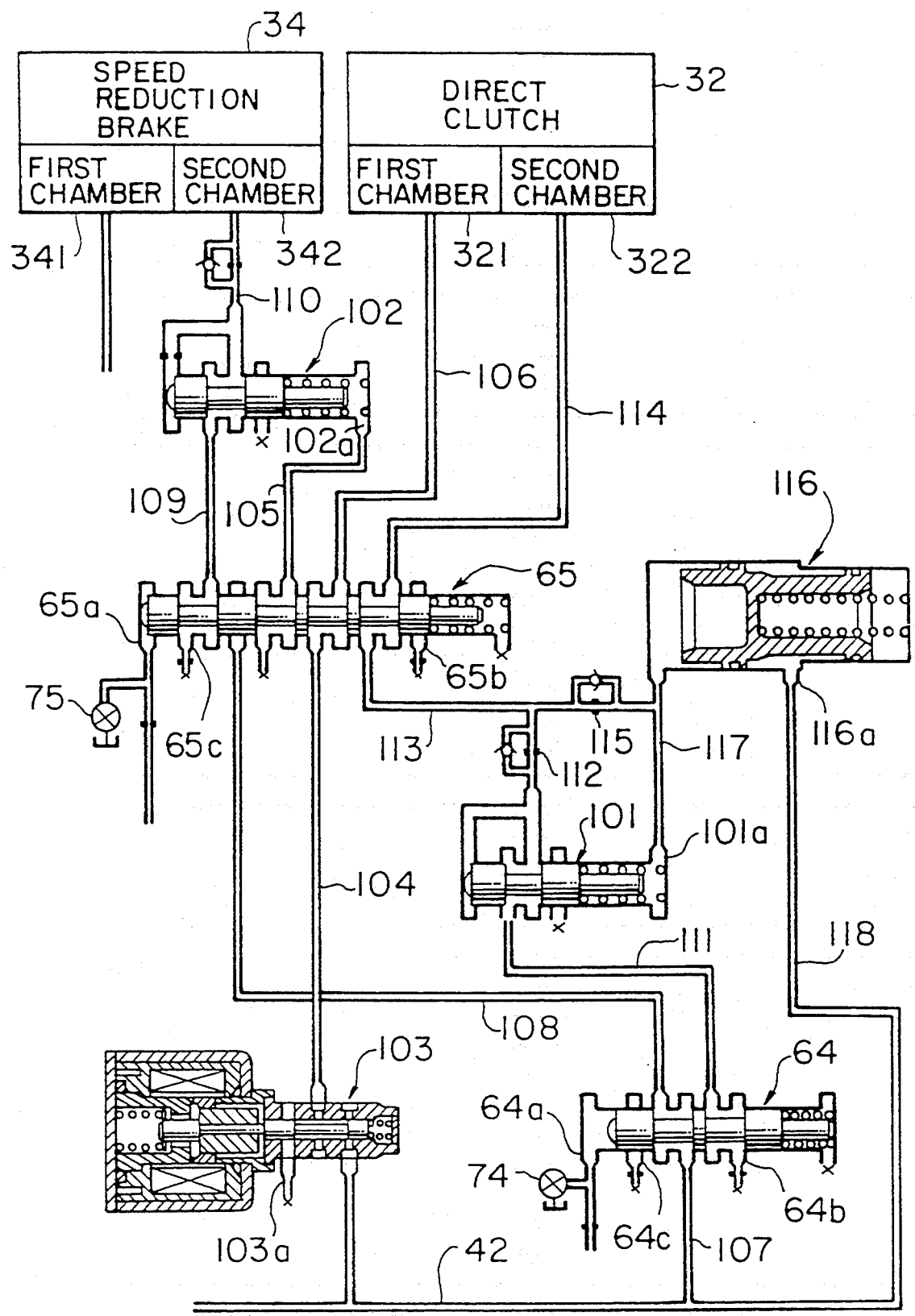
FIG. 14 is a hydraulic circuit showing an intermediate condition in the 4-3 shift operation.

Referring to a flow chart shown in FIG. 13, the controller 160 reads signals from the sensors 161–166 (step S1) and judges whether or not the 4-3 shift command has been made based on the signals in step S2. If the judgment is NO, or if the transmission is not under the 4-3 shift operation, the controller 160 carries out the other shift control (step S3). If the judgment in step S2 is YES or if the 4-3 shift command has been made, the controller 160 sets a backup timer for completing the shift operation within a predetermined time period in step S4. Next, the controller 160 calculates the gear ratio of the main transmission 20 based on the first and second speed sensors 164 and 165 and judges whether the shift operation is completed or the timer is counted out in step S5. The controller continues the transient control in step S6 until the judgment in step S5 is switched to YES. As shown in FIG. 13, the fourth solenoid valve 74 is turned OFF to switch the fourth shift valve 64 to discharge the engaging pressure from the second chamber 322. Next, the controller 160 provides the second linear solenoid valve 103 with power supply. Then, the controller 160 increases the electric current to the valve 103 to bring the drain port 103a into communication with the lines 104 and 106 so that the engaging pressure is discharged from the first chamber 321 of the direct clutch 32.

Figure 15:
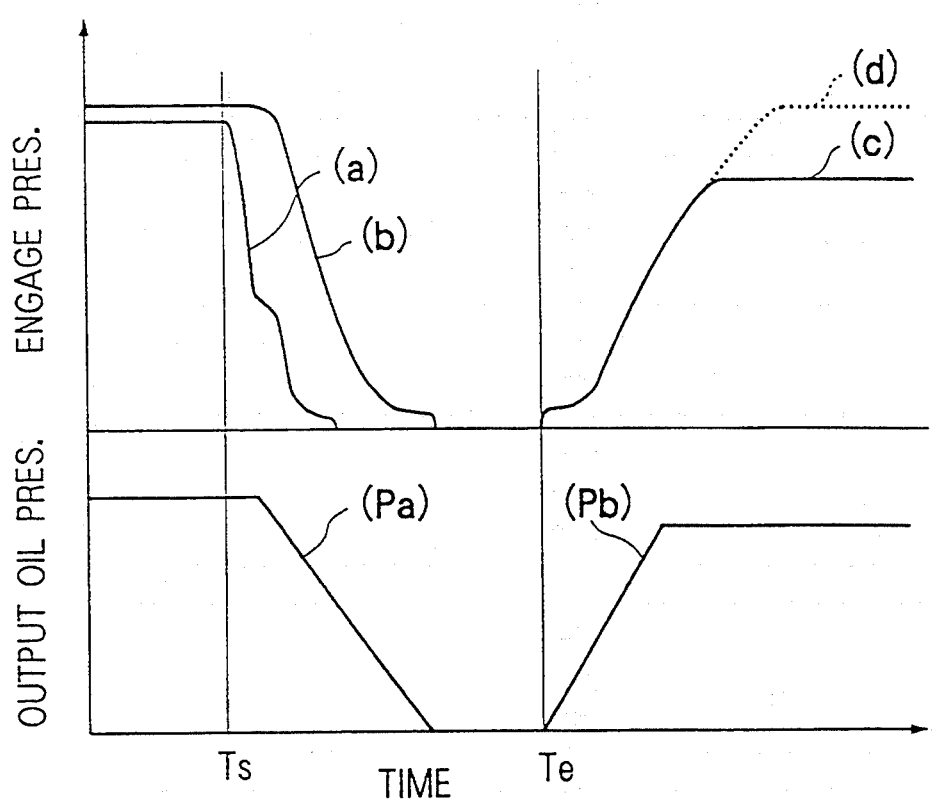
FIG. 15 is a graphical representation of the change of the engaging pressure in the sub-transmission for the 4-3 shift operation.

As a result, as shown in FIG. 15 by line (a), the engaging pressure is released from the second chamber 322 of the direct clutch 32 of the sub-transmission 30 after a time period Ts from the start of the 4-3 shift operation. A little bit later, the controller 160 switches the second linear solenoid valve 103 from non power supply condition to power supply condition so that the drain port 103a of the valve 103 is gradually opened as the electric current thereto is increased. As a result, the output pressure from the solenoid valve 103 is gradually reduced to zero as shown in FIG. 15 by line (Pa). Then, the engaging pressure (line pressure) is released from the first chamber 321 as shown in FIG. 15 by line (b).

When the judgment is YES in step S5 or when the 4-3 shift operation is completed based on the gear ratio of the main transmission 20, or when the backup timer is counted out, the controller 160 switches the fifth solenoid valve 75 to OFF in addition to the fourth solenoid valve 74 so as to switch the fifth solenoid valve 65 and provides the second linear solenoid valve 103 with a predetermined current so as to complete the shift operation to the third shift stage.

As a result, the drain port 103a of the second linear solenoid 103 is closed. Thus, as shown in FIG. 15 by line (Pb), the output pressure of the valve 103 is gradually increased after the time period Te from the judgment of the completion of the shift operation. The output pressure is introduced into the port 102a of the speed reduction brake control valve 102 so that the engaging pressure is introduced into the second chamber 342 of the speed reduction brake 34 to engage the brake 34.

As aforementioned, in the fourth shift stage, the power supply to the second linear solenoid valve 103 is turned off to reduce the power consumption and improve the durability of the solenoid valve 103. This is remarkable since the fourth shift stage is frequently established during running.

Meanwhile, in the first and third shift stages, the engaging pressure is introduced into the second chamber 342. In the second and third shift stages, even if the power supply is shut down for some reason, the line pressure is introduced into the second chamber 342 through the valve 103 and the port 102a of the speed reduction control valve 102 as shown in FIG. 15 by line (d). Thus, a fail safe function can be effectively obtained for the fail of the second linear solenoid valve 103.

When the shift stage is switched from the fourth shift stage, in which the engaging pressure is introduce into both the first and second chambers 341 and 342 to engage the direct clutch 34, to the first or third shift stage in which the direct clutch 34 is released, the engaging pressure is discharged from the second chamber 322 first and thereafter from the first chamber 321 so that the reduction of the engaging pressure is made gradually. Thus, a shift torque shock can be obviated in the shift operation from the fourth to the third or first shift stages.

Figure 16:
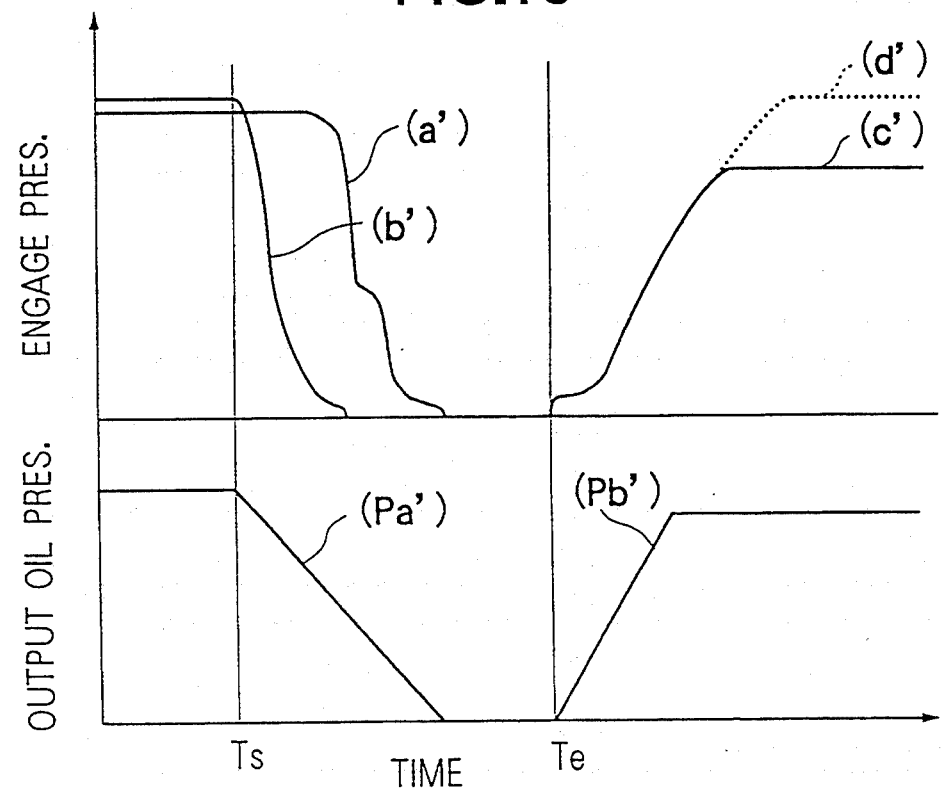
FIG. 16 is a graphical representation similar to FIG. 15 but according to a still another embodiment.

Referring to FIG. 16, there is shown another embodiment of a control for discharging the engaging pressure from the first and second chambers 321 and 322. In the fourth shift stage, the second linear solenoid valve 103 is turned ON to reduce the output pressure of the valve 103 after the time Ts from the start of the 4-3 shift operation as shown in FIG. 16 by line (Pa'). Thus, the engaging pressure (line pressure) is discharged from the first chamber 321. A little bit later, the fourth solenoid valve 74 is turned OFF to switch the fourth shift valve 64 to discharge the engaging pressure from the second chamber 322 as shown in FIG. 16 by line (a'). Thereafter, the power supply is applied to the second linear solenoid valve 103 to increase the output pressure of the solenoid valve 103 as shown in FIG. 16 by line (Pb'). In addition, the fifth solenoid valve is turned OFF to switch the fifth shift valve 65 to supply the engaging pressure to the second chamber 342 of the speed reduction brake 34. In this case, the second linear solenoid valve 103 gets no power supply in the fourth shift stage. Thus, the electric consumption can be saved. The shift shock can be suppressed and the fail safe function can be obtained as well as the former embodiment.

Hereinafter, another structure of the sub-transmission will be explained.

Figure 17:
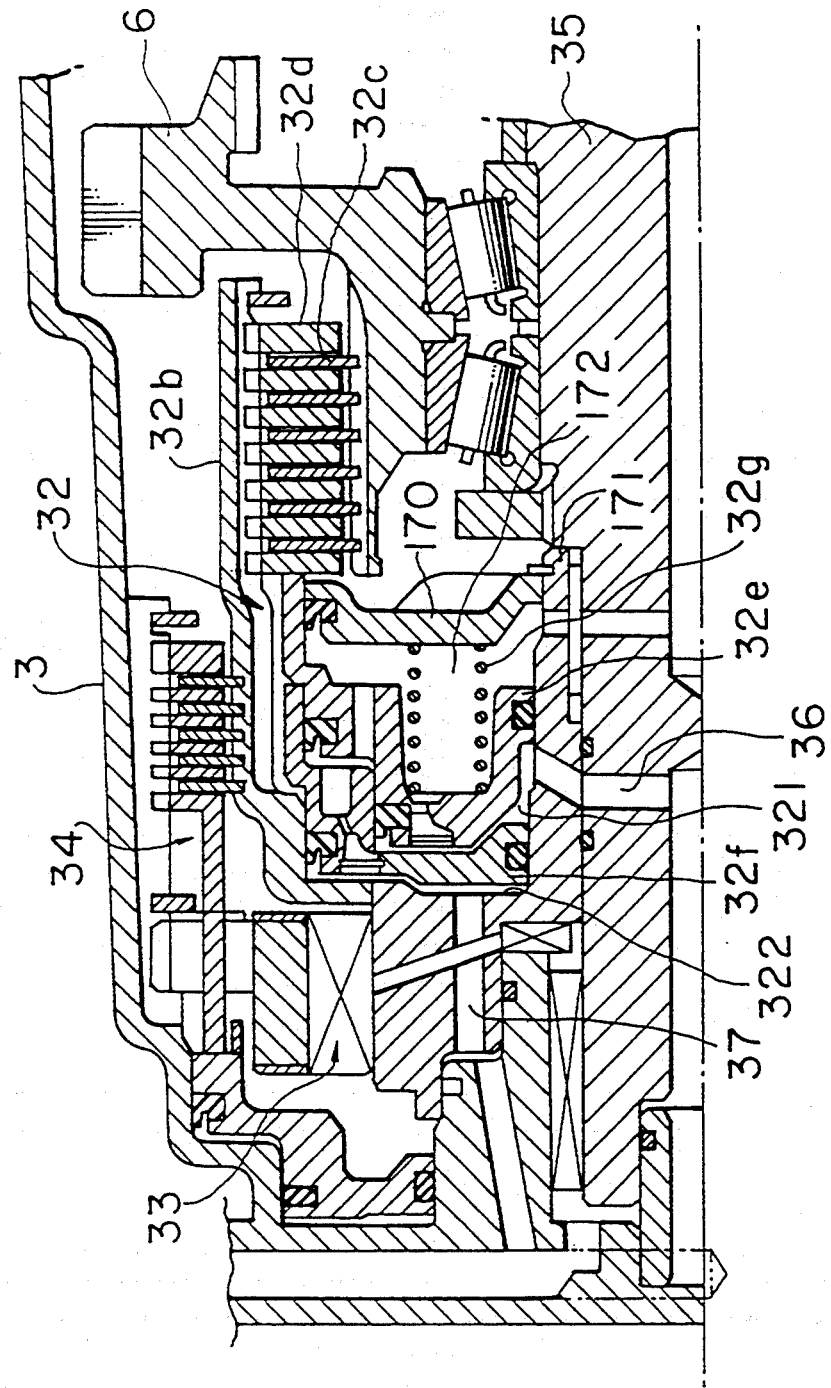
FIG. 17 is a sectional view of the sub-transmission in accordance with further embodiment.

Referring to FIG. 17, the illustrated sub-transmission is provided with first piston 32e having a smaller pressure area and second piston 32f having a larger pressure area. The return spring 32g is disposed between the first piston 32e and a stationary wall member 170 disposed in front of the first piston 32e. The wall member 170 is fixed to joint member 171 at the inner end. The member 171 joins integrally the clutch drum 32b with the shaft 35 of the sub-transmission. The second piston 32f is slidably disposed between the joint member 171 and the clutch drum 32b in the axial direction of the shaft 35. When the hydraulic pressure is introduced into the second chamber 322 through the oil passage 37, the frictional plates 32c and 32d is urged with the larger engaging force by the second piston 32f. On the other hand, when the hydraulic pressure is introduced into the first chamber 321 through the hydraulic passage 36, the frictional plates 32c and 32d are urged with a smaller engaging force by the first piston 32e.

If the engaging pressure is introduced into both the first and second chambers 321 and 322, the frictional plates 32c and 32d are subjected to the same engaging force as the engaging pressure is introduced into the second chamber 322.

The sub-transmission 30 as illustrated is formed with a balance chamber 171 for relieving an excessive pressure produced by the first and second chambers 321 and 322 by virtue of the centrifugal force due to the rotation of the transmission 30.

Figure 18:
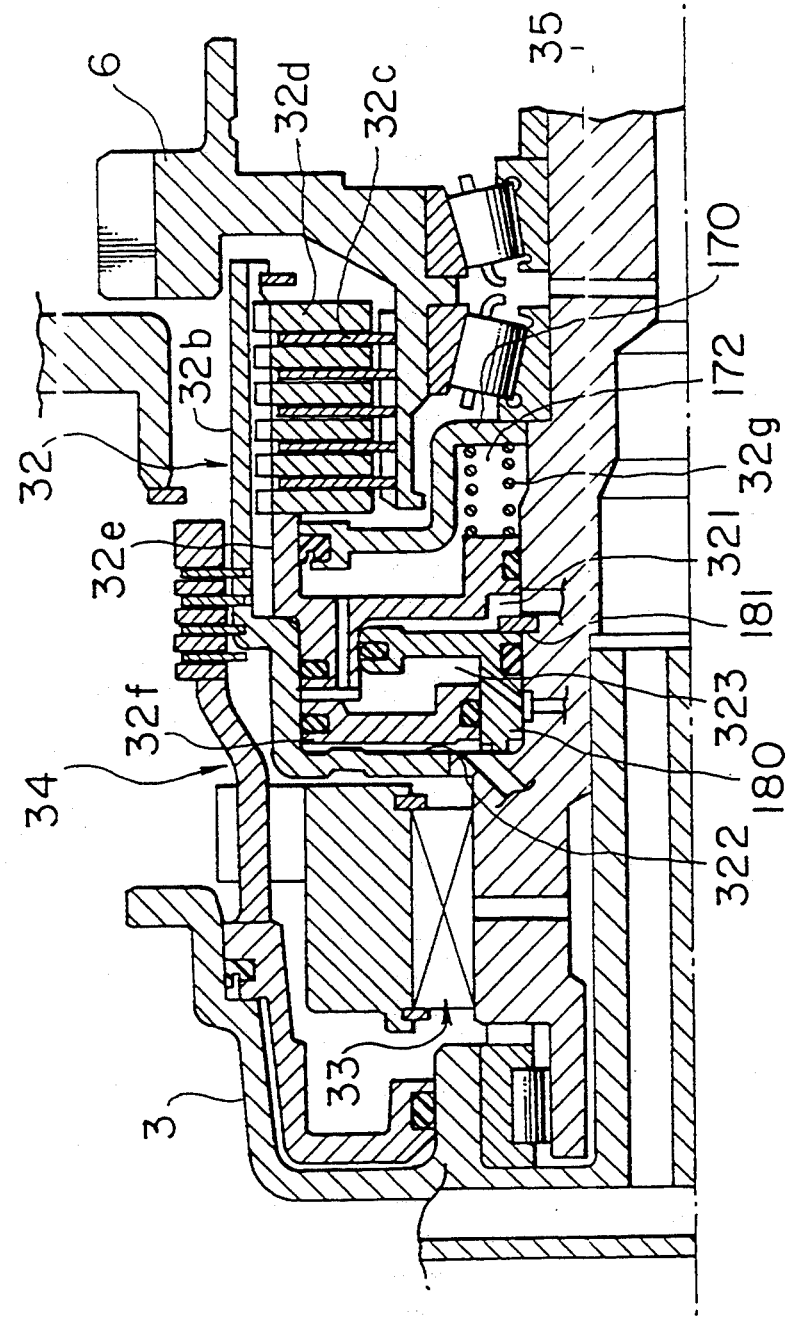
FIG. 18 is a sectional view of the sub-transmission in accordance with still further embodiment.

Referring to FIG. 18, there is shown still another embodiment.

The illustrated structure is provided with an intermediate stationary member 180 fixed to the shaft 35 by a snap ring 181. The second piston 32f is slidably disposed between the member 180 and the clutch drum 32b and the first piston 32e is disposed between the clutch drum 32b and the shaft 35 and slidable between the intermediate member and the stationary wall member 170 in the axial direction of the shaft 35. The return spring is disposed between the wall member 170 and the first piston 32e. An intermediate hydraulic chamber 323 is defined by the rear surface of the first piston 32e, the front surface of the second piston 32f, the inner surface of the clutch drum 32b and the intermediate stationary member 180. The first chamber is defined by the rear surface of the first piston 32e, the front surface of the intermediate stationary member 180 and the outer surface of the sub-transmission shaft 35. When the engaging pressure is introduced into only the intermediate chamber 323, the smallest engaging force is produced for urging the frictional plates 32c and 32d. When the engaging pressure is introduced into both the intermediate chamber 323 and the first chamber 321, the greatest engaging force is produced for urging the frictional plates 32c and 32d. When the engaging pressure is introduced into only the first chamber 321, an intermediate engaging force can be obtained. Thus, the engaging force of the frictional plates can be changed by three steps. Since the illustrated structure is also provided with the second chamber 322, the first piston 32e is urged by the second piston 32f so that further engaging force can be obtained. This structure is also formed with the balance chamber 172 as the former embodiment.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A multiple stage automatic transmission comprising
   a main transmission mechanism,
   a sub-transmission mechanism connected with the main transmission mechanism for introduction of a torque therefrom,
   a frictional element connected with the sub-transmission, and
   changing means for changing an engaging force of the frictional element in accordance with a shift mode.

2. A multiple stage automatic transmission as recited in claim 1 wherein the changing means changes the engaging force of the frictional element in response to a shift operation of a shift stage of the main transmission mechanism.

3. A multiple stage automatic transmission as recited in claim 2 wherein the changing means provides the engaging force with a relatively great value when the shift stage of the main transmission mechanism is a low speed shift stage and with a relatively small value when the shift stage of the main transmission mechanism is a high speed shift stage.

4. A multiple stage automatic transmission as recited in claim 1 wherein the frictional element comprises a first piston of a larger pressure area to which an engaging hydraulic pressure is applied for producing a larger engaging force of the frictional element and a second piston of a smaller pressure area for producing a smaller engaging force of the frictional element.

5. A multiple stage automatic transmission as recited in claim 4 wherein both the first piston and the second piston are actuated for producing a largest engaging force.

6. A multiple stage automatic transmission as recited in claim 4 wherein the first piston is disposed coaxially with and in front of the second piston.

7. A multiple stage automatic transmission as recited in claim 4 wherein the first piston is disposed coaxially with and behind the second piston.

8. A multiple stage automatic transmission as recited in claim 4 wherein a balance chamber for relieving an excessive pressure produced by a centrifugal force is provided in front of the first piston.

9. A multiple stage automatic transmission as recited in claim 4 and further comprising a first hydraulic chamber defined behind the first piston and in front of the second piston for receiving the engaging hydraulic pressure to urge the first piston and a second hydraulic chamber defined behind the second piston to urge the second piston.

10. A multiple stage automatic transmission as recited in claim 9 and further comprising an intermediate member disposed in the first hydraulic chamber to form an intermediate hydraulic chamber behind the first hydraulic chamber so that the engaging force is made variable by selectively introducing the engaging hydraulic pressure into the first, second and intermediate chambers.

* * * * *